(12) United States Patent
Watanabe et al.

(10) Patent No.: US 8,461,075 B2
(45) Date of Patent: Jun. 11, 2013

(54) RECORDING MATERIAL AND METHOD OF RECORDING

(75) Inventors: Norifumi Watanabe, Chuo-ku (JP); Yoshiyuki Onai, Chuo-ku (JP); Jun Kaneda, Chuo-ku (JP); Atsushi Katsuya, Chuo-ku (JP); Kenshiro Shimada, Chuo-ku (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 1540 days.

(21) Appl. No.: 11/661,676

(22) PCT Filed: Sep. 2, 2005

(86) PCT No.: PCT/JP2005/016143
§ 371 (c)(1),
(2), (4) Date: Mar. 2, 2007

(87) PCT Pub. No.: WO2006/030654
PCT Pub. Date: Mar. 23, 2006

(65) Prior Publication Data
US 2008/0113861 A1      May 15, 2008

(30) Foreign Application Priority Data

Sep. 3, 2004   (JP) ................................ 2004-256565
Sep. 10, 2004  (JP) ................................ 2004-264403
Aug. 25, 2005  (JP) ................................ 2005-243932

(51) Int. Cl.
*B41M 5/00*      (2006.01)

(52) U.S. Cl.
USPC ........ 503/201; 503/202; 428/195.1; 428/206; 428/913; 430/200; 430/945

(58) Field of Classification Search
USPC .......... 428/195.1, 206, 207, 913; 430/270.12, 430/945, 200; 503/202, 211, 201
See application file for complete search history.

(56) References Cited

U.S. PATENT DOCUMENTS

| | | | |
|---|---|---|---|
| 4,529,992 A * | 7/1985 | Ishida et al. ................. | 503/204 |
| 5,409,797 A | 4/1995 | Hosoi et al. | |
| 5,626,966 A | 5/1997 | Külper et al. | |
| 5,853,955 A * | 12/1998 | Towfiq ..................... | 430/270.12 |
| 5,858,583 A | 1/1999 | Dessauer et al. | |
| 6,017,972 A | 1/2000 | Harris et al. | |
| 2004/0071994 A1 | 4/2004 | Busch et al. | |
| 2010/0075848 A1 * | 3/2010 | Khan et al. ................. | 503/201 |

FOREIGN PATENT DOCUMENTS

| | | |
|---|---|---|
| EP | 0 366 461 A2 | 5/1989 |
| EP | 0 727 322 A1 | 8/1996 |
| EP | 0 782 933 A1 | 7/1997 |
| EP | 0 894 896 A2 | 2/1999 |
| EP | 0 941 866 A1 | 9/1999 |
| JP | 56-144995 | 11/1981 |
| JP | 58-209594 | 12/1983 |
| JP | 60-110737 | 6/1985 |
| JP | 02-235687 | 9/1990 |
| JP | 03-270980 | 12/1991 |
| JP | 05-229256 | 9/1993 |
| JP | 05-254252 | 10/1993 |
| JP | 05-301458 | 11/1993 |
| JP | 07-025154 | 1/1995 |
| JP | 7-323662 | 12/1995 |
| JP | 08-025809 | 1/1996 |
| JP | 9-1936 | 1/1997 |
| JP | 10-138642 | 5/1998 |
| JP | 11-78243 | 3/1999 |
| JP | 11-152117 | 6/1999 |
| JP | 11-240251 | 9/1999 |
| JP | 11-254831 | 9/1999 |
| JP | 2000-044736 | 2/2000 |
| JP | 2001-089632 | 4/2001 |
| JP | 2001-096916 | 4/2001 |
| JP | 2001-113830 | 4/2001 |
| JP | 2003-510416 | 3/2003 |
| JP | 2004-122614 | 4/2004 |
| JP | 2004-522631 | 7/2004 |
| JP | 2004-535310 | 11/2004 |
| JP | 2006-69086 | 3/2006 |
| JP | 4269936 | 3/2009 |
| WO | WO 2004/012515 A1 | 2/2004 |
| WO | WO 2005/047009 A1 | 5/2005 |
| WO | WO 2005/068207 A1 | 7/2005 |

OTHER PUBLICATIONS

Machine translation detailed description of JP 2001-096916 A created on Sep. 6, 2010.*
Machine translation detailed description of JP 2005-186491 A created on Sep. 6, 2010.*
Machine translation detailed description of JP 11-078243 A created on Sep. 6, 2010.*
"Color glass production" acquired from http://glassmuseum.cca.gov.tw/web-EN/unit03/modepage/3-4-1-07.html on May 3, 2011.*

* cited by examiner

*Primary Examiner* — Gerard Higgins
(74) *Attorney, Agent, or Firm* — Oblon, Spivak, McClelland, Maier & Neustadt, L.L.P.

(57) ABSTRACT

The present invention relates to recording material having a laser coloring layer, wherein the laser coloring layer comprises one or more materials selected from among pigments, dyes and inorganic materials, and the laser coloring layer exhibits absorption at a wavelength within a range from 700 to 12,000 nm. The recording material of the present invention has a laser coloring layer of a desired hue, such as yellow, cyan, magenta, orange, white or black, and by conducting printing by laser irradiation, a recorded item with excellent color tone can be obtained.

21 Claims, No Drawings

RECORDING MATERIAL AND METHOD OF RECORDING

TECHNICAL FIELD

The present invention relates to a recording material having a laser coloring layer. Furthermore, the present invention also relates to a method of recording that uses this recording material, and a method of producing a recorded item. Moreover, the present invention also relates to a material for food packaging, a material for industrial resources and a recorded item that use the above recording material.

BACKGROUND ART

In recent years, laser marking has become widely used as a method of specifying the date of manufacture, use-by date, name of the manufacturer, product name, and serial number and the like on the surface of beverage cans, beverage containers, cosmetics containers and pharmaceutical containers, or electronic components, electrical components, electrical products, vehicle components, sheets and cards and the like. Laser marking methods are non-contact, offer rapid marking, are capable of marking materials regardless of their surface shape, and can be readily automated and controlled. In addition, laser marking enables direct marking of the material itself, meaning marking can be completed without the use of typical solvent-containing inks, and as a result, laser marking has recently been attracting considerable attention as an environmentally clean marking method.

In the case of printed matter generated by conventional laser marking (for example, see Japanese Patent Laid-Open No. H05-229256, Japanese Patent Laid-Open No. H05-254252, Japanese Patent Laid-Open No. H05-301458, Japanese Patent Laid-Open No. H08-25809, Japanese Patent Laid-Open No. H10-138642, Japanese Translation of PCT International Application No. 2004-522631, and Japanese Patent Laid-Open No. H03-270980), in addition to issues relating to the sharpness and contrast of the printing, in most cases the printed matter comprises either black or brown printing on a white background or white printing on a black background, meaning the printed matter lacks color tone.

Furthermore, conventional laser marking methods are generally only capable of printing onto a surface, and for example, no technology exists for simultaneously forming convex protrusions in addition to the printing, thereby embellishing the printing in terms of both feel and visual appearance. In contrast, the convex protrusion forming capabilities of foaming inks are widely used for a variety of applications including Braille printing, weight reduction, preventing bottle breakage, delustering, surface modification processing, heat insulation and cushioning, but coloring only the foamed portions a different color from the foaming ink layer is generally impossible. Accordingly, depending on the way in which the printed matter is used, the existence or location of the convex protrusions can be difficult to detect.

DISCLOSURE OF INVENTION

Accordingly, an object of the present invention is to provide a recording material for laser marking, which is capable of providing a recorded item of excellent color tone, that also has convex protrusions in addition to lettering and images. Furthermore, another object of the present invention is to provide a method of recording and a method of producing a recorded item that use the above recording material. Moreover, another object of the present invention is to provide a material for food packaging, a material for industrial resources and a recorded item that use the above recording material.

The present invention relates to a recording material having a laser coloring layer, wherein the laser coloring layer comprises one or more materials selected from among pigments, dyes and inorganic materials, and the laser coloring layer exhibits absorption at a wavelength within a range from 700 to 12,000 nm.

The above recording material may also have a surface protection layer.

Furthermore, the present invention also relates to a method of recording, wherein a YAG laser or a $YVO_4$ laser is irradiated onto the above recording material.

Furthermore, the present invention also relates to a method of producing a recorded item, comprising the step of irradiating a YAG laser or a $YVO_4$ laser onto the above recording material.

Furthermore, the present invention also relates to a material for food packaging that uses the above recording material.

Furthermore, the present invention also relates to a material for industrial resources that uses the above recording material.

Furthermore, the present invention also relates to a recorded item obtained using the above method of producing a recorded item, wherein the height of convex protrusions is within a range from 1 to 3,000 μm.

This Application is based upon and claims the benefit of priority from prior Japanese Application 2004-256565 filed on Sep. 3, 2004, prior Japanese Application 2004-264403 filed on Sep. 10, 2004, and prior Japanese Application 2005-243932 filed on Aug. 25, 2005; the entire contents of which are incorporated herein by reference.

BEST MODE FOR CARRYING OUT THE INVENTION

A recording material of the present invention has a laser coloring layer. The laser coloring layer comprises one or more materials selected from among pigments, dyes and inorganic materials (hereafter also referred to as "the pigment or the like"), and exhibits absorption at a wavelength within a range from 700 to 12,000 nm.

In a recording material of the present invention, laser irradiation causes the pigment or the like incorporated within the laser coloring layer to undergo decomposition, gasification, or carbonization or the like, thereby coloring (or decoloring) the laser-irradiated sections and recording lettering or the like on the recording material. Furthermore, in a recording material of the present invention, laser irradiation may also cause the pigment or the like incorporated within the laser coloring layer to undergo decomposition or gasification or the like that causes the laser-irradiated portions to foam and generate convex protrusions, thereby recording lettering or the like on the recording material.

Besides the one or more materials selected from among pigments, dyes and inorganic materials, the laser coloring layer typically comprises a binder resin, and if required, may also comprise additives that improve properties such as the ink qualities, the printability and the coating properties.

Pigments of various colors including yellow, magenta, cyan, ink black, grass green, violet or white can be used as the pigment. Furthermore, dyes of the same hues as the pigments can be used as the dye.

In those cases where a pigment or dye is used, the hue of the laser coloring layer essentially corresponds with the hue of the pigment or dye. Furthermore, in those cases where neither a pigment nor dye is used, the hues of the inorganic material, binder resin and additives become the main color hues.

Configurations in which the laser coloring layer is colored by laser irradiation include the configurations 1) through 3) described below.

1) In those cases where the laser coloring layer exhibits absorption of the laser that is used, but that absorption is weak, coloring of the laser coloring layer is achieved by adjusting the laser irradiation conditions, for example, by conducting irradiation with a more powerful laser.

Specifically, this configuration describes those cases where the laser coloring layer comprises a pigment, dye or inorganic material, and may also include an optional binder resin and additives, and these materials exhibit weak absorption of the laser light, that is, the laser colorability is low. In these types of cases, printing can be conducted by optimizing the laser irradiation conditions, for example, by optimizing the laser power ratio (%), the Q-switch frequency, or the scan speed, as described below. Increasing the laser power ratio (%) (which increases the strength of the laser) is particularly effective.

Here, the meaning of the expression "weak absorption" varies depending on the specific combination with the laser used, but for example, refers to absorption at a wavelength of 1,064 nm (the wavelength of YAG, $YVO_4$ laser light) and/or 10,640 nm (the wavelength of a carbon dioxide gas laser) that falls within a range from 0.1 to 5%.

2) In those cases where the laser coloring layer exhibits satisfactory absorption of the laser that is used, printing can be conducted even with comparatively weak laser irradiation.

Specifically, this configuration describes those cases where the laser coloring layer comprises a pigment, dye or inorganic material, and may also include an optional binder resin and additives, and these materials exhibit satisfactory absorption of the laser light, resulting in satisfactory laser colorability. In terms of the pigment, for laser light at 1,064 nm (the wavelength of YAG, $YVO_4$ laser light), cyan and green pigments generally exhibit stronger absorption than magenta and yellow pigments. Furthermore, many pigments exhibit absorption at 10,640 nm (the wavelength of a carbon dioxide gas laser).

Here, the meaning of the expression "satisfactory absorption" varies depending on the specific combination with the laser used, but for example, refers to absorption at a wavelength of 1,064 nm and/or 10,640 nm that falls within a range from 6 to 20%.

Examples of pigments that exhibit laser absorption, besides the cyan and green pigments mentioned above, include carbon black, graphite and black lake.

Moreover, printing can also be achieved in those cases where the optional binder resin and/or additives exhibit satisfactory laser absorption. Examples of binder resins that exhibit satisfactory laser absorption include cellulose-based resins, and particularly nitrocellulose resins.

3) Examples of those cases where the laser coloring layer exhibits strong absorption of the laser that is used include cases in which the laser coloring layer comprises an inorganic material.

In the present invention, inorganic materials can be used favorably as materials that exhibit strong absorption, namely, as materials with a high degree of laser colorability.

Here, the meaning of the expression "strong absorption" varies depending on the specific combination with the laser used, but for example, refers to absorption at a wavelength of 1,064 nm and/or 10,640 nm that falls within a range from 21 to 95%.

Examples of inorganic materials that exhibit strong absorption include one or more materials selected from among copper compounds, molybdenum compounds, iron compounds, nickel compounds, chromium compounds, zirconium compounds and antimony compounds, and preferably one or more materials selected from among copper compounds, molybdenum compounds, chromium compounds and nickel compounds, and even more preferably mixed copper and molybdenum oxides.

In the case of this configuration 3), printing with high levels of sharpness and contrast can be obtained by irradiation with a comparatively weak laser. When a laser is irradiated onto a laser coloring layer comprising an inorganic material, the inorganic material itself becomes colored, and the nearby binder resin and additives and the like are also affected, enabling an even greater improvement in the coloring. Furthermore, cases also exist where although the inorganic material itself is not colored upon laser irradiation, the nearby binder resin and additives and the like become colored. Furthermore, with this configuration 3), particularly favorable print quality with excellent levels of sharpness, contrast and visibility can be obtained.

It is thought that the printing achieved in these configurations 1) through 3) is due to decomposition, gasification and carbonization of the pigment, dye or inorganic material, as well as the binder resin and the additives and the like, incorporated within the laser coloring layer.

These configurations 1) through 3) need not necessarily be clearly differentiated, and the laser coloring layer may also include two or more pigments, dyes or inorganic materials. Furthermore, the laser coloring layer may also comprise a pigment, dye or inorganic material that exhibits strong absorption, and a pigment, dye or inorganic material that exhibits weak absorption.

In those cases where the laser coloring layer comprises a combination of a pigment or dye that exhibits weak absorption of the laser being used, and an inorganic material that exhibits strong absorption, the inorganic material alone can be colored by irradiation with a weak laser. In such cases, printing having a hue derived from the inorganic material can be produced within a laser coloring layer having a hue derived from the pigment or dye. For example, black printing derived from the inorganic material can be produced on a yellow background derived from the pigment or dye. In addition, printed matter with excellent visibility such as black printing on a magenta background or black printing on a white background can be obtained.

A laser coloring layer of the present invention comprises a pigment, dye and/or inorganic material. In the present invention, the laser coloring layer preferably comprises a pigment and/or an inorganic material, and even more preferably comprises an inorganic material. A pigment exhibits favorable coloring properties and heat resistance, and is preferred in terms of ease of formation of a background color. Furthermore, an inorganic material is preferred as it enables a printed item with excellent levels of sharpness, contrast and visibility to be obtained.

In this description, pigments are broadly classified as either organic pigments or inorganic pigments. As follows is a description of organic pigments, separated into their representative hues.

Examples of yellow pigments include fast yellow G, fast yellow 10G, fast yellow FGL, disazo yellow AAA, disazo yellow AAOT, disazo yellow AAMX, flavanthrone yellow, disazo yellow H10G, disazo yellow HR, chromophtal yellow GR, isoindolinone yellow G and benzimidazolone yellow H2G.

Examples of orange pigments include pyrazolone orange, dianisidine orange, benzimidazolone orange HL, perinone orange and pyranthrone orange.

Examples of magenta pigments include lake red 4R, naphthol carmine FB, brilliant fast scarlet, naphthol red BS, naphthol red FRR, naphthol red M, permanent red 2B (Ba), permanent red (Ca), permanent red 2B (Mn), lake red C, lithol red (Ba), brilliant carmine 3B, brilliant carmine 6B, pyrazolone red, brilliant scarlet G, chromophtal scarlet and quinacridone red E.

Examples of violet pigments include methyl violet lake, rhodamine B lake, dioxazine violet and thioindigo magenta.

Examples of cyan pigments include Victoria blue lake, peacock blue lake, phthalocyanine blue R, phthalocyanine blue G, metal-free phthalocyanine blue, indigo carmine lake and indanthrone blue.

Examples of green pigments include brilliant green lake, malachite green lake, phthalocyanine green 6Y and pigment green B.

Describing an example of a case in which a recording material of the present invention is produced by printing, any pigment selected from among yellow, magenta and cyan pigments is used as the organic pigment, and by conducting a printing process in which, if necessary, a material with a high degree of laser colorability is combined with this basic printing color, laser colorability can be imparted to the printed item without increasing the number of inks. Furthermore, even for the one or more pigments selected from among yellow, magenta and cyan pigments, by adjusting the quantity of these pigments, and where necessary adding a material with favorable laser colorability, the sharpness, contrast and visibility of the background of the printed item can be improved.

Among inorganic pigments, examples of white pigments include titanium oxide, basic lead sulfate, zinc oxide, zinc sulfide and antimony oxide.

Among the inorganic pigments, examples of extender pigments include precipitated barium sulfate, barium carbonate, precipitated calcium carbonate, diatomaceous earth, talc, clay, basic magnesium carbonate and alumina white.

The use of one or more pigments selected from among titanium oxide, zinc sulfide, zinc oxide, precipitated barium sulfate, barium carbonate and precipitated calcium carbonate as the inorganic pigment yields printed matter with favorable visibility. In particular, if titanium oxide is used as a white pigment, and this pigment is used for either a portion of, or all of, the colorant within the printing ink for forming the laser coloring layer, then printed matter with excellent visibility can be obtained. Both anatase and rutile can be used as the titanium oxide.

In addition, other pigments that can be used in the present invention include carbon black, graphite and black lake.

In order to improve the sensitivity of the laser coloring layer to laser light, one or more highly heat-absorbent materials selected from among carbon black, graphite and black lake may be added to the laser coloring layer depending on the intended purpose and application of the layer. By using these materials, white printing on a black background becomes possible, meaning printed matter with excellent visibility can be obtained.

In the present invention, the use of copper phosphonates having an aromatic ring as the pigment is also desirable. Copper phosphonates having an aromatic ring readily undergo an oxidation reaction at the temperatures used during recording, enabling the formation of blacks or browns with very high tinting strength. Examples of these pigments include copper phenylphosphonate, copper 2-methoxyphenylphosphonate, copper 4-methoxyphenylphosphonate, copper 4-ethylphenylphosphonate, copper 2-isopropylphenylphosphonate, copper 3-nitrophenylphosphonate, copper 4-nitrophenylphosphonate, copper 2-methyl-4-nitrophenylphosphonate, copper 3-methyl-5-nitrophenylphosphonate, copper 2-chloro-5-methylphenylphosphonate, copper 4-chlorophenylphosphonate, copper 4-bromophenylphosphonate, copper 2-iodophenylphosphonate and copper 2-fluorophenylphosphonate. Because copper phenylphosphonates exhibit a high level of heat resistance, favorable dispersion within resins and the like, and can be synthesized inexpensively, they are particularly preferred. Two or more copper phosphonates having an aromatic ring may also be used in the form of a mixture.

In order to improve the thermal conductivity during recording and the sensitivity to laser light, the copper phosphonate having an aromatic ring preferably includes one or more materials selected from among inorganic materials, carbon black and graphite. Two or more materials selected from among inorganic materials, carbon black and graphite may also be used in the form of a mixture. Furthermore, the mixing weight ratio between the copper phosphonate having an aromatic ring and the one or more materials selected from among inorganic materials, carbon black and graphite is preferably within a range from 99.9:0.1 to 10:90, and even more preferably from 95:5 to 50:50.

There are no particular restrictions on the dyes that can be used, which can be selected in accordance with the intended purpose, application and usage environment of the recording material. In particular, if conventional colorants and developers used in typical thermosensitive recording are used as the dye, then printed matter with superior visibility can be obtained.

For example, the coloring compounds used as electron donors within typical thermosensitive recording can be used as colorants. Examples include leuco dyes such as fluoran-based leuco dyes, phenothiazine-based leuco dyes, spiropyran-based leuco dyes, triphenylmetaphthalide-based leuco dyes and rhodamine lactam-based leuco dyes. Specific examples of suitable leuco dyes include 3,3-bis(p-dimethylaminophenyl) phthalide, 3,3-bis(p-dimethylaminophenyl)-6-dimethylaminophthalide, 3,3-bis(p-dimethylaminophenyl)-6-aminophthalide, 3,3-bis(p-dimethylaminophenyl)-6-nitrophthalide, 3,3-bis(p-dimethylaminophenyl) phthalide, 3,3-bis(3-dimethylamino)-7-methylfluoran, 3-diethylamino-7-chlorofuran, 3-diethylamino-6-chloro-7-methylfluoran, 3-diethylamino-7-anilinofluoran, 3-diethylamino-6-methyl-7-anilinofluoran and 3-piperidino-6-methyl-7-anilinofluoran.

Developers are typically used in combination with the colorants.

Examples of developers that can be used include those materials used as electron acceptors within typical thermosensitive recording materials, such as 4-phenylphenol, 4-hydroxyacetophenone, 2,2-dihydroxydiphenyl, 2,2-methylenebis(4-chlorophenol), 2,2-methylenebis(4-methyl-6-t-butylphenol), 4,4-isopropylidenediphenol, 4,4-isopropylidenebis(2-chlorophenol), 4,4-isopropylidenebis(2-methylphenol) and 4,4-ethylenebis(2-methylphenol), as well as acidic white clay kaolin, zeolites, aromatic carboxylic acids and anhydrides thereof, and organic sulfonic acids. Of these, phenol-based compounds are preferred.

The ratio between the aforementioned colorant and the developer preferably provides from 2 to 10 parts by weight of the developer for every 1 part by weight of the colorant.

Leuco dyes exhibit favorable colorability under the heat generated by laser irradiation, and are consequently particularly desirable. In the present invention, particularly in those cases where a dye is used, because the dye can be possibly eluted even if a surface protection layer such as that described below is provided on the recording material, the production process for the product preferably includes no boiling or retorting.

Inorganic materials that can be used in the present invention include, for example, 1) simple metals, 2) metal salts, 3) metal hydroxides, and 4) metal oxides. In the present invention, the inorganic material preferably employs a material that exhibits strong absorption, that is, a material that exhibits strong laser colorability.

1) Examples of simple metals include iron, zinc, tin, nickel, copper, silver and gold.

2) Examples of metal salts include copper carbonate, nickel carbonate, manganese carbonate, cobalt carbonate, lanthanum carbonate, magnesium nitrate, manganese nitrate, iron nitrate, cadmium nitrate, zinc nitrate, cobalt nitrate, lead nitrate, nickel nitrate, copper nitrate, palladium nitrate, lanthanum nitrate, magnesium acetate, manganese acetate, cadmium acetate, zinc acetate, cobalt acetate, lead acetate, nickel acetate, copper acetate, palladium acetate, copper chloride, iron chloride, cobalt chloride, nickel chloride, silver chloride, zinc chloride, copper phosphate, iron phosphate, cobalt phosphate, copper pyrophosphate, copper sulfate, iron sulfate, cobalt sulfate, copper oxalate, iron oxalate, cobalt oxalate, copper benzoate, iron benzoate and cobalt benzoate.

3) Examples of metal hydroxides include copper hydroxide, aluminum hydroxide, magnesium hydroxide, zinc hydroxide, antimony hydroxide, cobalt hydroxide, nickel hydroxide, iron hydroxide and lanthanum hydroxide.

4) Examples of metal oxides include silicon oxide, aluminum oxide, iron oxide, magnesium oxide, cobalt oxide, lead oxide, tin oxide, indium oxide, manganese oxide, molybdenum oxide, nickel oxide, copper oxide, palladium oxide, lanthanum oxide, antimony-doped tin oxide (ATO), indium-doped tin oxide (ITO), synthetic zeolites, natural zeolites and mixed copper and molybdenum oxide (42-903A, manufactured by Tokan Material Technology Co., Ltd.)

A material with a layered structure such as mica, montmorillonite or smectite can also be used as the metal oxide.

If the inorganic material is one or more compounds selected from among copper compounds, molybdenum compounds, iron compounds, nickel compounds, chromium compounds, zirconium compounds and antimony compounds, then the thermal conductivity during recording can be improved, and the resulting high level of thermosensitivity ensures excellent coloring properties.

The inorganic material is even more preferably one or more compounds selected from among copper compounds, molybdenum compounds, chromium compounds and nickel compounds.

In particular, mixed copper and molybdenum oxides exhibit powerful self-coloring properties, and the resin in the vicinity of the mixed copper and molybdenum oxide can also be readily blackened, meaning printed matter of excellent visibility can be obtained.

Among the inorganic materials, titanium oxide and precipitated barium and the like can also be classified as inorganic pigments, and in the present invention, they are classified as pigments that represent one of the structural components of the laser coloring layer. In the present invention, strict classification of these materials is not particularly critical.

The combined total, within the laser coloring layer, of the materials selected from among pigments, dyes and inorganic materials is preferably within a range from 0.1 to 90 parts by weight within each 100 parts by weight of the laser coloring layer, as such quantities produce a favorable balance between the coating strength, the cohesive force, and the coloring properties of the laser coloring layer. Quantities within a range from 5 to 60 parts by weight are even more desirable.

If the quantity is less than 0.1 parts by weight, then although favorable cohesive force is achieved for the coating, the coloring properties tend to deteriorate. Furthermore, if the quantity exceeds 90 parts by weight, then the strength and cohesive force of the coating deteriorate, and laser irradiation may cause a deterioration in the folding resistance of the laminated recording material, and may even cause interlayer separation.

Examples of binder resins that can be used within the laser coloring layer include acrylic resins, acrylic-modified urethane resins, styrene-acrylic resins, ethylene-acrylic resins, urethane resins, polyester resins, rosin-modified maleic acid resins, vinyl chloride-vinyl acetate copolymers, polyvinyl acetal resins, polyamide resins, and cellulose-based resins such as hydroxyethyl cellulose, hydroxypropyl cellulose and nitrocellulose. These resins may be used either alone, or in mixtures of two or more different resins.

Of these resins, urethane resins are ideal for recording materials as they exhibit favorable adhesion to films, and excellent thermal relaxation properties. Furthermore, cellulose resins, and particularly nitrocellulose resins, exhibit favorable laser colorability, and improve the coloring properties of the laser coloring layer even in cases where the laser absorption properties of the pigment or the like are poor. Moreover, mixed resins of a urethane resin and a nitrocellulose resin are also desirable.

Furthermore, a photocurable resin or the like can also be used as the binder resin. Specific examples include unsaturated polyester resins, acrylate resins, polyene-polythiol resins, spirane resins, epoxy resins, aminoalkyd resins, diallyl phthalate resins, unsaturated polyester resins, and furan resins. These resins can be used in combination with monomers such as radiation-curable monomers, prepolymers and photopolymerization initiators as required.

In addition, conventional thermoplastic resins or thermosetting resins can also be used. Specific examples of suitable thermoplastic resins include polyethylene resins, polypropylene resins, polystyrene resins, acrylic resins, polyvinyl chloride resins, polycarbonate resins, nylon resins, urethane resins, polyester resins, ABS resins and polylactic acid resins. Polypropylene resins, which contain no halogens that can result in the generation of dioxins on incineration, are inexpensive and are widely used in the marketplace, and polyester resins, which exhibit particularly high levels of transparency and a high degree of recyclability, are particularly preferred. Specific examples of suitable thermosetting resins include melamine resins, urea resins, phenolic resins, epoxy resins, urethane resins, polyimide resins, diallyl phthalate resins, unsaturated polyester resins and furan resins.

In terms of the cohesive force of the coating and the adhesion to substrates, the quantity of the binder resin within the laser coloring layer is preferably within a range from 10.0 to 99.9 parts by weight within each 100 parts by weight of the laser coloring layer. If this quantity is less than 10.0 parts by weight, then because the quantity of the resin component is so small, the adhesion of the coating to substrates and the cohesive force of the coating deteriorate, which tends to invite deterioration in both the folding resistance, and the storage stability over time of the recording material. Furthermore, if the quantity exceeds 99.9 parts by weight, then the laser colorability tends to deteriorate.

Examples of additives include sensitizers such as sulfonate esters, sulfonic acid amides, diphenylsulfonic acids, naphthol derivatives and urea derivatives, as well as activators, ultraviolet absorbers, pigment dispersants, antifoaming agents, leveling agents, waxes, silane coupling agents, preservatives, rust-proofing agents, plasticizers and flame retardants.

These additives are used particularly for the purposes of improving the printability and printing effects of printing inks used for forming the laser coloring layer, and the type of additives used and the quantities used can be selected appropriately in accordance with the printing method, the printing substrate and the printing conditions.

Foaming of the laser coloring layer can be achieved even without including a foaming agent, by using the gas generated by oxidation or decomposition of the pigment or the like upon irradiation with the laser light, but the laser coloring layer may also include a foaming agent. Furthermore, a separate layer comprising a foaming agent may be provided separately from the laser coloring layer.

Examples of foaming agents that may be used in the recording material include 1) thermal decomposition-type chemical foaming agents, and 2) thermal expansion-type microcapsule foaming agents that include an encapsulated low boiling point hydrocarbon. Examples of the former include azodicarbondiamide and azobisisobutyronitrile foaming agents. In the case of the latter, a low boiling point hydrocarbon is encapsulated within microcapsules of an acrylonitrile-acrylic copolymer or a vinylidene chloride-acrylonitrile copolymer or the like. Specific examples include Matsumoto Microspheres F-30, F-50, F-80S and F-85 (all manufactured by Matsumoto Yushi-Seiyaku Co., Ltd.).

In a recording material of the present invention, the laser coloring layer is typically provided on top of a substrate. A recording material of the present invention preferably has a laminated structure comprising at least two layers, namely a substrate and the laser coloring layer.

Furthermore, in a recording material of the present invention, an additional surface protection layer can be provided either directly or indirectly on top of the laser coloring layer. The recording material preferably has a laminated structure comprising at least three layers, namely a substrate, the laser coloring layer, and a surface protection layer. In such cases, the surface protection layer can prevent detachment, shattering or abrasion of the printed surface during printing or during subsequent use.

There are no particular restrictions on the method used for providing the laser coloring layer on top of the substrate, and suitable methods include (I) methods in which the laser coloring layer is formed by printing a printing ink comprising one or more materials selected from among pigments, dyes and inorganic materials, (II) methods in which the laser coloring layer is formed by applying a coating liquid comprising one or more materials selected from among pigments, dyes and inorganic materials, and (III) methods in which the laser coloring layer is formed by bonding a sheet or film obtained by forming a resin comprising one or more materials selected from among pigments, dyes and inorganic materials.

In the present invention, methods in which the laser coloring layer is formed by conducting printing using a laser coloring layer printing ink are preferred.

The laser coloring layer is printed all over onto either the entire surface of, or a portion of, the substrate, and is then provided for use. The printing surface area and the printing site is determined appropriately in accordance with factors such as the size, the visibility, and the design aesthetics of the intended printing or pattern. In those cases where an inorganic material with a high degree of laser colorability is added to a printing ink comprising a pigment or a dye, high-visibility marking can be imparted to printed matter with the same types of printing configurations and print patterns as conventional items. In such cases, laser printing is conducted at those sections where the printing ink containing the added inorganic material is located.

The laser coloring layer is formed by printing the laser coloring layer printing ink onto the substrate, and then conducting processes such as solvent drying and radiation curing and the like. The laser coloring layer printing ink comprises one or more materials selected from among pigments, dyes and inorganic materials, and where necessary, binder resins, additives, solvents or radiation-curable monomers and the like. This type of laser coloring layer printing ink can be prepared as a gravure printing ink, offset printing ink, flexo printing ink or silk screen printing ink or the like.

Next is a detailed description of (I) a process for producing a recording material by printing. Production of a laminated recording material having a laser coloring layer is preferably conducted by: 1) preparing a laser coloring layer printing ink, 2) conducting printing onto a substrate comprising a film or paper or the like, and 3) forming a surface protection layer in those cases where a surface protection layer is required. These steps are described below in sequence.

1) Preparation of a Laser Coloring Layer Printing Ink

The laser coloring layer printing ink (hereafter also referred to as "the printing ink") comprises one or more materials selected from among pigments, dyes and inorganic materials. In those cases where an ink comprising no inorganic materials is used for the laser coloring layer, there are no particular restrictions on the production or preparation of the ink. Inks can also be formed by adding an inorganic material to a printing ink, or even in the case of production of a printing ink comprising an inorganic material as a principal component, ink preparation can be conducted using typical ink preparation methods.

The quantity of the pigment, dye or inorganic material within the laser coloring layer printing ink is preferably within a range from 5 to 90% by weight relative to the combined weight of all the components of the printing ink.

In those cases where an inorganic material is added to a printing ink, depending on the nature of the inorganic material, simple addition and stirring of the inorganic material may not produce satisfactory dispersion of the inorganic material within the ink, and even if dispersion is achieved, if the particle size is overly large, then the ink is more likely to suffer from a deterioration in the printability and printing effects, or from unsatisfactory coloring. Accordingly, depending on the nature of the inorganic material, the inorganic material is preferably dispersed within a liquid solvent medium such as an organic solvent or water, using a dispersant or resin or the like. The resins or dispersants used is selected with due consideration of their suitability for dispersing the inorganic material, and their compatibility with the printing ink that functions as the base. The quantity used of the inorganic material is preferably sufficient that, following addition, the quantity of the inorganic material relative to the combined weight of all the components of the final printing ink is within a range from 1 to 60% by weight. Quantities within a range from 2 to 50% by weight are even more preferred. If the quantity of the inorganic material exceeds 60% by weight, then the ink becomes prone to dispersion anomalies, and there is a possibility of a loss in the recording characteristics of the recording material. If the quantity is less than 1% by weight, then the degree of reduction in the coloring properties increases.

Examples of the dispersion device used in the preparation of a coating liquid by dispersing the inorganic material in a liquid medium such as an organic solvent or water or the like include a paint conditioner (manufactured by Red Devil Equipment Co.), ball mill, sand mill (such as a "Dyno-mill" manufactured by Shimmaru Enterprises Corporation), attritor, pearl mill (such as a "DCP mill" manufactured by Eirich GmbH), coball mill, homomixer, homogenizer, (such as "Clearmix" manufactured by M Technique Co., Ltd.), wet jet mill (such as a "Genus PY" manufactured by Genus Corporation) and a "nanomizer" manufactured by Nanomizer, Inc.). If media are used in the dispersion device, then the use of glass beads, zirconia beads, alumina beads, magnetic beads or styrene beads or the like is preferred.

The organic solvent can use any of the conventional solvents used in printing, and suitable examples include ethanol, isopropyl alcohol, ethyl acetate, methyl isobutyl ketone, 1-methoxy-2-propanol, toluene and xylene.

In the case of the production of an ink that comprises an inorganic material as a principal component, basically the same method as that described above for the dispersion of inorganic materials can be used.

Various additives may also be added to the printing ink according to need to ensure favorable applicability as a printing ink. A dispersion comprising an inorganic material as a principal component obtained in this manner, namely a printing ink, can either be used alone, or if required, can be simply added to another printing ink that comprises no inorganic materials and acts as a base, such as a yellow ink, red ink or cyan ink, thereby dramatically improving the laser colorability of the base ink. Particularly in those cases where an ink comprising an inorganic material that blackens upon laser coloring is prepared, and this ink is then added to a white ink comprising no inorganic materials that acts as the base ink, laser coloring can be used to produce black printing on a white background or a whitish background, thus yielding a printed item with a high level of contrast and excellent visibility.

Although formation of convex protrusions can be readily achieved even without a foaming agent, depending on the size and shape of the convex protrusions desired, a foaming agent may also be added to the printing ink. The quantity added is preferably within a range from 0.1 to 40% by weight of the ink. If this quantity is less than 0.1% by weight, then the foaming effect is inferior, whereas if the quantity exceeds 40% by weight, the foaming becomes extreme, and the shape of the printed convex protrusions become prone to deformation. In those cases where a foaming agent is used, drying of the ink is conducted at a temperature less than the foaming temperature.

2) Conducting Printing onto a Substrate Comprising a Film or Paper or the like

Examples of substrates that can be used in the present invention include plastics and papers. Examples of suitable plastic films include low density polyethylenes, unstretched or stretched polypropylenes, polyesters, nylons, polystyrenes, polyvinyl chlorides, polycarbonates and polyvinyl alcohol films and the like, as well as films of polypropylene, polyester, nylon or cellophane or the like that have been coated with polyvinylidene chloride or the like. Furthermore, vapor deposition films such as PET films onto which silica or the like has been deposited can also be used. Moreover, formed sheets or films can also be used as the substrate. Examples include the polypropylenes, polyesters, polystyrenes and polycarbonates listed above. These substrates can be used favorably for personal identification cards, driver licenses and bank cards. Examples of papers that can be used include art papers, coated papers, high-quality papers, Japanese papers, and synthetic papers.

There are no particular restrictions on the thickness of the substrate. In the case of plastic films, films typically used for printing can be used with no further modification. For example, in the case of polyethylene terephthalate (PET), films of 12 to 40 µm can be used favorably, whereas in the case of biaxially stretched polypropylene (OPP), films of 20 to 50 µm can be used favorably.

Other substrates may involve providing the laser coloring layer either directly, or indirectly using an anchor coating agent, on the surface of glass, metal or wood or the like, and then either simply using the resulting glass, metal or wood or the like, as a recording material, or forming an additional surface protection layer, thus producing a recording material in which the laser coloring layer is sandwiched in the middle. This type of glass can be used within housing, the glass for windows within buildings, mirrors, and glass tableware.

In the present invention, formation of the laser coloring layer using a printing ink is preferably conducted by screen printing, flexo printing or gravure printing. In those cases where a solvent is used in the printing ink, the recording material is dried thoroughly following printing using a dryer or the like.

Printing onto the substrate is classified as either single color printing or overprinting. In the former case, a laser coloring layer printing ink with strong coloring properties and comprising an inorganic material as the primary component can be printed onto the substrate. Furthermore, printing a laser coloring layer printing ink with weak coloring properties and comprising a pigment as the primary component onto the substrate is also possible. Moreover, by printing a laser coloring layer printing ink comprising an inorganic material and a pigment onto the substrate, a recording material that exhibits excellent contrast upon coloring can be obtained. In the latter case, for example in the case where two layers of printing ink are built up onto the substrate, the printing inks used for the first layer and the second layer can be selected in accordance with which surface of the final recording material is to be subjected to laser printing or viewing. A printing ink with a high degree of laser colorability is preferably positioned on the side of the recording material that is to be subjected to laser printing or viewing. For example, in those cases where the recording material is to be viewed from the substrate side of the material, the laser coloring layer printing ink with a high degree of laser colorability is preferably printed first, and the laser coloring layer printing ink with weaker laser colorability is then built up thereon. When the recording material is to be viewed from the opposite side to the substrate, the reverse applies.

In the case of overprinting, the contrast is a important factor to enhance the visibility. For example, in the case where a laser coloring layer printing ink that yields a black color is used, a colored ink having a hue that provides a high level of contrast is preferably used as a background. For example, in the case of viewing from the substrate side of the material, a substrate/laser coloring layer (that yields black)/white or yellow ink layer (colored ink) structure is preferred. When a white ink is used as the background, a recording material with particularly superior printability can be obtained.

Specifically, the recording material can be produced with two or more laser coloring layers, wherein at least one of the laser coloring layers comprises a white pigment, and at least one of the other laser coloring layers comprises an inorganic material.

Printed items obtained in this manner can adopt a variety of configurations, including (a) substrate/laser coloring layer, (b) substrate/laser coloring layer with strong colorability/ laser coloring layer with weak colorability, and (c) substrate/ laser coloring layer with weak colorability/laser coloring layer with strong colorability.

Printed items of the above configurations comprise a substrate and a laser coloring layer. Although there are no particular restrictions on the thickness of the laser coloring layer, values within a range from 1 to 100 µm/layer are preferred. If this thickness is less than 1 µm, then because the laser coloring layer is very thin, the laser coloring density decreases, and the visibility deteriorates. If the thickness exceeds 100 µm, then although satisfactory coloration is obtained, achieving adequate strength (mechanical properties) for the coating layer becomes impossible.

3) Forming a Surface Protection Layer

Broadly speaking, surface protection layers can be formed by 1) methods comprising applying a coating liquid that forms the surface protection layer to the laser coloring layer, and then drying the coating liquid, 2) methods comprising applying a coating liquid that forms the surface protection layer to the laser coloring layer, drying the coating liquid, and then conducting curing by irradiation, and 3) methods comprising bonding a film that forms the surface protection layer to the laser coloring layer, either directly or with an adhesive layer provided therebetween.

There are no particular restrictions on the thickness of the surface protection layer, and in the case of methods where the layer is formed from a coating liquid, the thickness is preferably at least 1 µm. In the case of methods where the layer is formed by bonding a film, the thickness is preferably at least 10 µm. Although there are no particular restrictions on the upper limit, the thickness is preferably no greater than 200 µm.

In those cases where the surface protection layer is formed from a coating liquid, examples of suitable coating liquid binder resins include cellulose, methyl cellulose, methoxy cellulose, hydroxyethyl cellulose, carboxymethyl cellulose, polyvinyl alcohol, polyacrylamide, polyacrylic acid, casein, gelatin, styrene-maleic anhydride copolymer salts, isobutylene-maleic anhydride copolymer salts, polyacrylate esters, polyurethane resins and acrylic-styrene resins, which are water-soluble. Examples of solvent-based resins include styrene-maleic acid resins, acrylic-styrene resins, polystyrenes, polyesters, polycarbonates, epoxy resins, polyurethane resins, polybutyral resins, polyacrylate esters, styrene-butadiene copolymers, styrene-butadiene-acrylic acid copolymers and polyvinyl acetates. In order to improve properties such as the film strength, heat resistance, water resistance and solvent resistance of the surface protection layer, curing agents may also be added to the coating liquid. Examples of suitable curing agents include isocyanate-based curing agents, oxazoline-based curing agents, carbodiimide-based curing agents and ethyleneimine-based curing agents. From the viewpoints of film strength and film properties, an isocyanate-based curing agent is preferred. Among isocyanate-based curing agents, trifunctional or higher compounds are particularly favorable.

If necessary, the coating liquid that forms the surface protection layer may also include additives such as antifoaming agents, ultraviolet absorbers, lubricants and antistatic agents for the purpose of improving the ease of application and the physical properties of the coating, or solvents such as isopropyl alcohol, methyl isobutyl ketone, 1-methoxy-2-propanol or toluene for the purpose of improving the ease of application.

In those cases where a radiation-curable layer is provided as the surface protection layer, monomers, prepolymers or oligomers or the like having one or more ethylenic unsaturated bonds are used. Examples of monomers that can be used in the present invention include monofunctional monomers such as N-vinylpyrrolidone, acrylonitrile, styrene, acrylamide, 2-ethylhexyl acrylate, 2-hydroxy(meth)acrylate, 2-hydroxypropyl (meth)acrylate, tetrahydrofurfuryl acrylate, phenoxyethyl acrylate, nonylphenoxyethyl acrylate, butoxyethyl(meth)acrylate, 2-hydroxy-3-phenoxypropyl acrylate, cyclohexyl (meth)acrylate, N,N-dimethylamino(meth)acrylate, N,N-dimethylaminoethyl (meth)acrylate, 3-phenoxypropyl acrylate and 2-methoxyethyl(meth)acrylate, bifunctional monomers such as ethylene glycol diacrylate, diethylene glycol diacrylate, polypropylene glycol diacrylate, neopentyl glycol diacrylate, tetraethylene glycol diacrylate, 1,4-butanediol di(meth)acrylate, 1,6-hexanediol di(meth)acrylate and 1,12-dodecanediol di(meth)acrylate, trifunctional monomers such as trimethylolpropane tri(meth) acrylate, trimethyloloctane tri(meth)acrylate, trimethylolpropane polyethoxy tri(meth)acrylate and pentaerythritol tri (meth)acrylate, tetrafunctional monomers such as pentaerythritol polypropoxy tetra(meth)acrylate, ditrimethylolpropane tetra(meth)acrylate, and pentafunctional or higher monomers such as dipentaerythritol penta(meth)acrylate and dipentaerythritol hexa(meth)acrylate. When monomers, prepolymers or oligomers are used as a radiation-curable composition, the quantity of trifunctional or higher monomers, prepolymers or oligomers is preferably within a range from 20 to 95% by weight. If this quantity is less than 20% by weight, then the film density and film strength of the surface protection layer are poor, and in some cases the smoothness of the printing surface may deteriorate, and other physical properties such as the water resistance, oil resistance and abrasion resistance may also deteriorate. If the quantity exceeds 95% by weight, then the surface protection layer tends to become overly hard, increasing the likelihood of the surface protection layer detaching when the resulting printed item is folded.

In those cases where the radiation-curable composition is to be cured using ultraviolet light, a photopolymerization initiator, and in some cases a sensitizer, are required. Examples of suitable photopolymerization initiators include acetophenone-based initiators, benzophenone-based initiators, thioxanthone-based initiators, benzoin-based initiators and benzoin methyl ether-based initiators, whereas examples of sensitizers include amine-based compounds such as N-methyldiethanolamine, diethanolamine, triethanolamine and isoamyl p-dimethylaminobenzoate, as well as tri-n-butyl phosphine and Michler's ketone. In the case of electron beam curing, curing can be conducted without using the above photopolymerization initiators or sensitizers.

In order to cure the radiation-curable composition, 1) an ultra high pressure mercury lamp, high pressure mercury lamp, low-pressure mercury lamp, carbon arc lamp or metal halide lamp or the like is used for ultraviolet irradiation. 2) In the case of electron beam irradiation, any of the various electron accelerators can be used, including a Cockcroft-Walton accelerator, Van de Graff accelerator, resonance transformer accelerator, insulated core transformer accelerator, linear beam accelerator, dynamitron accelerator or high-frequency accelerator, and an electron beam with an energy level within a range from 100 to 1,000 eV is irradiated onto the composition.

In those cases where the surface protection layer is provided using a film, the types of plastic films used in typical laminates or print laminates, such as polyethylene, polypropylene and polyester films can be used.

In those cases where the surface protection layer is provided using a film, examples of suitable methods of laminating the film include 1) dry lamination methods, comprising applying a solvent-based adhesive to the printed film or paper, drying the solvent, and then bonding a film or the like, 2) melt extrusion methods comprising applying an anchor coating agent to the printed film or paper, conducting drying, and then conducting lamination of a melted resin such as polyethylene or polypropylene, or conducting lamination of another film with the above melted resin disposed therebetween, and 3) non-solvent lamination methods comprising applying a solvent-free adhesive to the printed film or paper under heating, thereby bonding the film. Any of these lamination methods is possible, but in those cases where it is desirable to suppress foaming within the laser-irradiated portions, dry lamination using a thick adhesive layer is preferred in order to prevent gas generation or swelling or the like caused by heating of the recording material.

Furthermore, in those cases where a film is used as the surface protection layer, the recording material can also be formed by bonding a layered film, prepared in advance by layering the film and an adhesive layer, to the laser coloring layer. This method is particularly favorable when a paper is used as the substrate.

Examples of adhesives that can be used in the present invention include water-based adhesives, solvent-based adhesives and solvent-free adhesives. Examples of water-based adhesives include polyurethane resin-based adhesives, polyvinyl acetate emulsion-based adhesives, acrylic emulsion-based adhesives, and epoxy emulsion-based adhesives. A water-based curing agent such as an isocyanate emulsion or carbodiimide emulsion may also be used in combination if required. Examples of solvent-based adhesives include polyurethane-based adhesives, one-pot or two-pot acrylic-based adhesives, and two-pot adhesives such as polyisocyanate-polyether-based adhesives and polyisocyanate-polyester-based adhesives. Examples of solvent-free adhesives include polyesterpolyol-isocyanate-based adhesives and polyetherpolyol-isocyanate-based adhesives.

Examples of anchor coating agents that can be used include polyester-isocyanate-based agents, polyether-isocyanate-based agents, ethyleneimine-based agents, butadiene-based agents and titanate-based agents. These anchor coating agents are applied to the printed surface using a gravure coater or roll coater or the like.

Furthermore, in the present invention, in terms of the method used for providing the laser coloring layer on top of the substrate, a method (II) in which the laser coloring layer is formed by dispersing or dissolving one or more materials selected from among pigments, dyes and inorganic materials, together with a binder resin, in a liquid medium, and then applying this liquid to a substrate can be used instead of using the printing method (I) described above. Moreover, a method (III) in which one or more materials selected from among pigments, dyes and inorganic materials is kneaded into a resin, and the resulting mixture is then formed into a sheet or film that is subsequently bonded to a substrate can also be used.

(II) As follows is a description of the case in which a laser coloring layer is provided using a coating liquid. In order to obtain a laser coloring layer from a coating liquid, the resin is first dissolved in an organic solvent if the resin is solid, whereas in the case of a liquid resin, the resin may either be used as is, or combined with an organic solvent prior to use. Particularly in those cases where the liquid medium comprises mainly water, in other words, is a water-based or water-soluble resin, the types of dispersions or soluble resins used in conventional paints and inks and the like, such as water-based acrylic emulsions, water-based urethane emulsions, water-based polyester emulsions and water-based acrylic-urethane emulsions can be used.

In those cases where the laser coloring layer is formed by application and subsequent coating formation, a coating liquid is first prepared. The coating liquid is prepared by dispersing or dissolving the pigment or the like in a liquid medium such as an organic solvent or water. Examples of dispersion devices that can be used in the preparation of the coating liquid include a paint conditioner (manufactured by Red Devil Equipment Co.), ball mill, sand mill (such as a "Dyno-mill" manufactured by Shinmaru Enterprises Corporation), attritor, pearl mill (such as a "DCP mill" manufactured by Eirich GmbH), coball mill, homomixer, homogenizer, (such as "Clearmix" manufactured by M Technique Co., Ltd.), wet jet mill (such as a "Genus PY" manufactured by Genus Corporation) and a "nanomizer" manufactured by Nanomizer, Inc.). If media are used in the dispersion device, then the use of glass beads, zirconia beads, alumina beads, magnetic beads or styrene beads or the like is preferred.

Describing the preparation of the coating liquid in further detail, in cases where a dye and a developer are used, these are either dissolved in a liquid medium such as an organic solvent or water, or are dispersed using a dispersing agent or a resin. In these cases, the weight of the dye and the developer relative to the combined weight of all the components of the coating liquid is preferably within a range from 5 to 50% by weight.

Furthermore, in cases where a pigment or an inorganic material is used, the quantity of the pigment or inorganic material within the coating liquid is preferably within a range from 0.5 to 40% by weight, and even more preferably from 2 to 30% by weight. If the quantity of pigment exceeds 40% by weight, then dispersion anomalies become more likely, and there is a possibility of a deterioration in the drawing properties and contrast of the laser coloring layer.

Although formation of convex protrusions can be readily achieved even without a foaming agent, depending on the size and shape of the convex protrusions desired, a foaming agent may also be added to the coating liquid. The quantity added is preferably within a range from 0.1 to 40% by weight of the coating liquid. If this quantity is less than 0.1% by weight, then the foaming effect is inferior, whereas if the quantity exceeds 40% by weight, the foaming becomes extreme, and the shape of the printed convex protrusions become prone to deformation. In those cases where a foaming agent is used, drying of the coating liquid is conducted at a temperature less than the foaming temperature.

If necessary, in order to improve the ease of application and the physical properties of the coating, the coating liquid may also include silica, which is added for purposes such as preventing blocking on the coated item and achieving delustering, other additives such as antifoaming agents, ultraviolet absorbers, lubricants, antistatic agents and curing agents, or solvents such as isopropyl alcohol, methyl isobutyl ketone, 1-methoxy-2-propanol or toluene, which are added for the purpose of improving the ease of application.

There are no particular restrictions on the coating method, and methods that can be used include spin coating, roll coating, comma coating, gravure coating, air knife coating, die coating and bar coating.

(III) In order to form a laser coloring layer from a sheet-like or film-like formed product, a master batch is first obtained by kneading the pigment or the like in a melt kneader, mixing this master batch with a resin, and then subjecting the resulting mixture to melt extrusion forming, yielding a sheet-like or film-like formed product. The laser coloring layer can be formed by bonding this formed product to a substrate.

Although formation of convex protrusions can be readily achieved even without a foaming agent, depending on the size and shape of the convex protrusions desired, a foaming agent may also be kneaded into the resin. The quantity added is preferably within a range from 1 to 30% by weight within the sheet-like or film-like formed product used for forming the final laser coloring layer. If this quantity is less than 1% by weight, then the foaming effect is inferior, whereas if the quantity exceeds 30% by weight, the foaming becomes extreme, and the shape of the printed convex protrusions become prone to deformation. In those cases where a foaming agent is used, because the foaming temperature of most foaming agents is typically less than the kneading temperature, appropriate selection of the type of foaming agent and the type of resin is important.

When a laser coloring layer is formed using a pigment or the like, if due consideration is given to factors such as the dispersibility of the pigment or the like and the adhesion to a variety of substrates, then the resin used in the laser coloring layer is preferably a urethane resin, acrylic resin, polyester resin, polyamide resin or polyacetal resin. If the adhesion to the substrate is weak, then problems such as detachment of the coloring layer during laser irradiation, and a deterioration in printability tend to arise. These problems are particularly noticeable when the substrate is a film. If consideration is given to general adhesion versatility relative to a variety of films, then urethane films are particularly desirable.

The basic configuration of a recording material of the present invention comprises a laser coloring layer formed on top of a substrate. In a preferred configuration, an additional surface protection layer is formed on top of the laser coloring layer. A variety of different configurations are possible for a laminated structure comprising a substrate, a laser coloring layer and a surface protection layer. For example, in cases where the substrate is a film, one possible configuration is (A) film/laser coloring layer/film. Lamination in this case can be conducted using heated rollers or the like, by utilizing the adhesiveness of the laser coloring layer itself. In applications where convex protrusions are not to be formed within the laser-irradiated portions, a configuration can be used that employs an adhesive to prevent laminate peeling or swelling or the like caused by the heat or gas generated during laser coloring, in other words, (B) film/laser coloring layer/adhesive/film. Because use of the adhesive enables a reduction in detachment or swelling of the surface protection layer, the sharpness and contrast achieved upon printing or drawing becomes favorable. Furthermore, as a result of using an adhesive, the strength is improved for the flat portions outside of the generated convex protrusions or laser-irradiated portions. Similar effects can be achieved with an anchor coating agent.

Furthermore, depending on the base color of the laser coloring layer and the thickness of the coating, two or more laser coloring layers may be provided simultaneously in order to improve the contrast, sharpness, and visual appearance upon printing or drawing. In such cases, the first laser coloring layer is formed on the side to undergo laser irradiation, namely, the side from which the printing is to be viewed, and the built up second laser coloring layer performs the role of improving the contrast and sharpness.

The configuration in this case is (C) film/laser coloring layer/laser coloring layer used primarily for improving contrast/adhesive/film. Another possible configuration is (D) film/laser coloring layer used primarily for improving contrast/laser coloring layer/adhesive/film. Either of the configurations (C) and (D) may be used depending on the usage situation. For example, the configuration chosen varies depending on the direction from which the printed matter of the recording material is to be viewed.

Other possible configurations include those including a barrier layer of aluminum or the like, such as (E) film/laser coloring layer/adhesive/aluminum/adhesive/film, and (F) silica deposition film/laser coloring layer/adhesive/film. The present invention can also be applied to the types of configurations typically used within packaging materials. In cases where a film is used as the substrate, a coating formed from a coating liquid can be used instead of a film as the surface protection layer. In such cases, other configurations can be realized in which the film that acts as the surface protection layer in the configurations described above is simply replaced with a coating. In these cases, adhesive layers are basically unnecessary. For example, the above configurations (A) and (B) both become film/laser coloring layer/coating.

In those cases where the substrate is a paper, the surface protection layer is formed either from a coating produced by applying a coating liquid, or from a film. In such cases, the laminated configurations (G) paper/laser coloring layer/coating, and (H) paper/laser coloring layer/film can be favorably employed. In the latter configuration, if required, a configuration with an internal adhesive layer, namely a configuration (I) paper/laser coloring layer/adhesive/film, may also be used favorably.

Furthermore, in order to achieve more favorable contrast and visual appearance for the printing or drawing relative to the paper, a configuration in which a laser coloring layer containing a white ink or colored ink that is used primarily for improving contrast is printed first, namely a configuration (J) paper/laser coloring layer used primarily for improving contrast/laser coloring layer/adhesive/film, is also possible. Configurations containing a paper substrate that are typically used as packaging materials can also be produced using the present invention.

In configurations that also employ a foaming agent, configurations in which the foaming agent is added to the laser coloring layer, namely configurations such as 1) substrate/(foaming agent+laser coloring) layer, 2) substrate/(foaming agent+laser coloring) layer/surface protection layer, and 3) substrate/(foaming agent+laser coloring) layer/adhesive/surface protection layer are possible. The substrate here may be a film, paper, or formed sheet or film.

Alternatively, configurations in which a layer containing the foaming agent is provided separately, namely configurations such as 1) substrate/foaming agent layer/laser coloring layer, 2) substrate/foaming agent layer/laser coloring layer/surface protection layer, and 3) substrate/foaming agent layer/laser coloring layer/adhesive/surface protection layer are also possible, as are configurations in which the sequence of the foaming agent layer and the laser coloring layer is reversed from the above configurations. The substrate here may be a film, paper, or formed sheet or film.

In any of the above configurations, a primer layer or anchor coating layer may also be provided to improve the adhesion between the substrate and the laser coloring layer, or in some cases between the substrate and the foaming agent layer.

Next is a description of a method of recording according to the present invention.

When a laser is irradiated onto the recording material having a laser coloring layer and a surface protection layer, oxidation, decomposition and carbonization and the like occur within the coloring layer, causing coloring of the recording material. Furthermore, in the present invention, by conducting a process in which a laser is irradiated onto the recording material, a recorded item can be produced in which lettering or drawing is recorded within the laser coloring layer.

The laser irradiation conditions are set by optimizing the Q-switch frequency, the laser power ratio, and the scan speed and the like. If the laser irradiation conditions are not optimized, for example if the laser strength is overly powerful, then the surface protection layer itself may be damaged, the coloring properties may deteriorate, and the convex protrusions formed by foaming may collapse. In contrast, if the laser strength is too weak, then the degree of coloring and convex protrusion formation becomes inadequate. Furthermore, even at the same laser strength, the coloring properties and the degree of convex protrusion formation vary depending on the absorption strength of the laser coloring layer and the recording material configuration. For example, thinner surface protection layers facilitate the formation of convex protrusions, but if the surface protection layer is too thin, then the surface protection layer may rupture as a result of the pressure that accompanies the internal carbonization, decomposition and gas generation. Other factors that affect the coloring properties and convex protrusion forming properties include the film strength, elongation rate, density and gas permeability and the like of the surface protection layer, the thickness, crosslinking density and elongation rate and the like of the adhesive layer, and the film strength and thickness and the like of the laser coloring layer. The strength of the adhesion between each of the layers that constitute the recording material also has an effect. For example, in a substrate/laser coloring layer/film configuration, because there is no adhesive layer between the laser coloring layer and the film layer, if the laser strength is overly powerful, then convex protrusions are also pushed up at locations outside of the irradiated areas, and in some cases the entire film may detach.

When conducting laser marking, the laser light is preferably irradiated from the side that ensures more favorable absorption by the laser coloring layer, and reduced scattering. For example, in the case of a film/laser coloring layer used primarily for improving contrast/laser coloring layer/adhesive/transparent film configuration, irradiation is preferably conducted from the side of the transparent film as the surface protection layer.

The laser light preferably has a wavelength within a range from 700 to 12,000 nm. The laser emission medium may be a solid, gas or liquid. Examples of suitable emission methods include continuous wave (CW) and pulsed emission methods. There are no particular restrictions on preferred laser light sources for the present invention, provided the laser light source has a wavelength within a range from 700 to 12,000 nm. Examples of lasers that can be used favorably with the present invention include a carbon dioxide gas laser (10,640 nm), a YAG laser (1,064 nm), and a $YVO_4$ laser (1,064 nm).

A YAG laser or $YVO_4$ laser is preferred, and a $YVO_4$ laser is particularly desirable, and because the laser power distribution is a single mode power distribution, precise printing is possible. If the wavelength is less than 700 nm, then the coloring properties deteriorate, and the printability is inferior. Furthermore, if the wavelength is greater than 12,000 nm, then depending on the conditions, the surface protection layer may be prone to damage, and deterioration in properties such as the visibility, solvent resistance and water resistance becomes more likely.

Provided absorption by the laser coloring layer of the laser light wavelength at 1,064 nm is within a range from 0.1 to 95%, printed matter with favorable coloring properties can be obtained as the recording material. Absorption values from 6 to 95% are even more desirable. If the absorption is less than 0.1%, then because the laser coloring layer exhibits almost no absorption, the coloring properties are inferior. If an attempt is made to improve the printability by strengthening the laser irradiation conditions, then the surface protection layer becomes prone to damage. Furthermore, if the absorption exceeds 95%, then although the coloring properties are favorable, the coating layers become prone to degeneration as a result of the laser irradiation, increasing the likelihood of partial detachment between the laser coloring layer and the substrate or the surface protection layer, and inviting deterioration of the print quality and the recording material strength.

In the present invention, the absorption of the laser coloring layer can be obtained by measuring the target laser coloring layer with an absorption spectrophotometer.

In this description, the absorption refers to the rate of absorption, in other words, 100%-reflectance (%).

The print quality can be controlled by controlling the irradiation conditions for the YAG laser or $YVO_4$ laser, namely 1) the laser power ratio (%), 2) the Q-switch frequency (kHz), and 3) the scan speed (mm/second).

The laser power ratio (%) is expressed as a ratio relative to the laser maximum output. Although the laser output can be controlled using the laser power ratio, if set too high, the surface protection layer is prone to damage. Furthermore, if set too low, the printing becomes indistinct.

The output of a laser used in the present invention is preferably within a range from 6 W to 30 W in the case of continuous wave output (CW output). The output of a carbon dioxide gas laser in continuous wave output (CW output) is preferably within a range from 10 W to 30 W.

Furthermore, the output of a $YVO_4$ or YAG laser in continuous wave output (CW output) is preferably within a range from 6 W to 10 W. During actual printing by laser, pulsed output defined by the Q-switch frequency is preferred. The output in such cases varies depending on the frequency, but in the case of a frequency of 20 kHz, is approximately 25 kW.

The Q-switch frequency represents the number of pulses per second. The Q-switch frequency also has an effect on the print quality, and causes a deterioration in the printability if too large or too small.

The scan speed is used to control the gap between print dots, and if set to too small a value, causes excessive grouping of the print dots, which can cause damage to the surface protection layer and the laser coloring layer. Furthermore, if the scan speed is too large, the gap between print dots widens, and a deterioration in print density and print quality can be seen.

The laser irradiation conditions in the present invention preferably satisfy at least one of the conditions (1) to (3) described below. Cases in which two of these conditions are satisfied are even more preferred, and cases in which all three conditions are satisfied are the most desirable.

(1) $80 \geq$ laser power ratio (%) $\geq 1$
(2) $100 \geq$ Q-switch frequency (kHz) $\geq 1$
(3) $4,000 \geq$ scan speed (mm/second) $\geq 10$ The laser conditions are preferably altered in accordance with the absorption properties of the laser coloring layer. Because the printability varies depending on the combination of the aforementioned laser power ratio (%), the Q-switch frequency (kHz), and the scan speed (mm/second), the power ratio and the scan speed, in particular, are preferably classified in the manner described below.

Cases where the absorption of the laser coloring layer is weak:
(1) $80 \geq$ laser power ratio (%) $\geq 60$
(2) $100 \geq$ Q-switch frequency (kHz) $\geq 1$
(3) $2,000 \geq$ scan speed (mm/second) $\geq 10$ Cases where the absorption of the laser coloring layer is strong:
(1) 60≧laser power ratio (%)≧1
(2) 100≧Q-switch frequency (kHz)≧1
(3) 4,000≧scan speed (mm/second)≧1,000

The laser light source used can also be selected taking due consideration of the materials and configuration of the recording material, and the desired printing state and the like. For example, in the case of laminated configurations that use a film of nylon (Ny), PET or OPP as the substrate, and a sealant film such as a polyethylene (PE) or unstretched polypropylene (CPP) film as the surface protection layer, if a YAG laser or $YVO_4$ laser is used, and the laser is irradiated from the substrate side of the laminate, then the laser light can pass through the substrate film, and color the laser coloring layer that represents the structural feature of the present invention. In these cases, similar coloring can be achieved even if laser irradiation is conducted from the side of the sealant film.

In the present invention, recording can also be conducted by using heating instead of laser irradiation. The heating temperature is preferably within a range from 250 to 550° C., and even more preferably from 300 to 500° C. Examples of suitable heating sources for conducting thermosensitive recording include thermal heads and thermal pens.

In the present invention, in the cases of application to food packaging or industrial materials, a laser coloring layer printing ink is printed onto the target substrate. In the case of materials for food packaging, the laser coloring layer printing ink can be used in a similar manner to typical printing inks. For example, the laser coloring layer printing ink is printed over a predetermined region, and if required, overprinting is then conducted over the same print region. Lamination is performed, and laser printing can then be conducted prior to packing with food, after packing, or after the completion of processes such as boiling or retorting. Examples of materials for industrial resources include labels or tags for products or components. When a recording material of the present invention is used as a label or tag or the like, the recording material of the present invention is attached to the product or component itself, or to a portion of the packaging of the product or component, using either an adhesive or strapping or the like. Furthermore, a laser coloring layer printing ink could also be pre-printed onto either a portion of, or the entire surface of, a packaging film, lamination then conducted, and the resulting laminate then used for packing the product.

By providing a laser coloring layer in this manner, recording can be conducted on a portion of, or across the entire surface of, materials for food packaging and materials for industrial resources. Information such as the use-by date, date of manufacture, lot number, or distribution identification number can also be printed individually onto materials for food packaging and materials for industrial resources. In this manner, by applying a method of recording according to the present invention to a laminate having a laser coloring layer, problems associated with conventional printed items such as detachment or scratching of the printing can be prevented, and smudging of the printing caused by contact with oil or water can also be prevented.

Using laser irradiation, the type of information described above such as the use-by date, date of manufacture, lot number, or distribution identification number can be printed directly using alphanumeric characters, hiragana and kanji and the like. Alternatively, a secondary barcode can be drawn, enabling an additional large quantity of various information to be recorded. The recording material of the present invention is preferably a laminate with a layered structure, and because writing is conducted within the interior of the laminate, the information can be stored and read without any danger of information loss. Examples of secondary barcodes that can be written and read include QR (model 1), QR (model 2), micro QR and DataMatrix barcodes.

In the present invention, by irradiating a laser onto the recording material, gas is generated within the interior of the recording material, enabling the formation of convex protrusions at the laser-irradiated portions.

In those cases where there is no surface protection layer, that is, in substrate/laser coloring layer configurations, the convex protrusions formed at the same time as the laser coloring are formed from the laser-colored portions. In those cases where a foaming agent layer is provided, namely substrate/foaming agent layer/laser coloring layer configurations, the convex protrusions are formed from the foaming agent layer and the laser coloring layer. If a surface protection layer exists, then at the very least, the surface protection layer itself forms the outer shape of the convex protrusions. In terms of factors such as the water resistance, solvent resistance and abrasion resistance of the recording material, as well as the sharpness of the laser coloring layer and the strength of the convex protrusions, a surface protection layer is preferably provided.

The shape of the convex protrusions when the recording material is viewed from a direction perpendicular to the material surface may be circular, square, rectangular, triangular, trapezoidal, a parallelogram, or any other desired shape. Furthermore, by combining, aligning or ordering the points assuming these shapes, or alternatively allowing disordering of the points, a wide range of objectives, and a wide range of physical, optical, mechanical or decorative functions can be achieved.

In these cases, the thickness of the surface protection layer is preferably within a range from 1 to 200 µm. If this thickness is less than 1 µm, then the shapes of the convex protrusions are likely to become indistinct, whereas if the thickness exceeds 200 µm, then formation of the convex protrusions becomes difficult, and the effects achieved by providing the surface protection layer diminish.

When convex protrusions are formed, the height of the convex protrusions is preferably within a range from 1 to 3,000 µm. If this height is less than 1 µM, then the physical, optical, mechanical or decorative effects imparted by the convex protrusions are minimal, whereas if the height exceeds 3,000 µm, then the shapes of the convex protrusions become prone to distortion upon friction or contact, and in severe cases, the convex protrusions may be crushed.

A recording material having a laser coloring layer according to the present invention can be used as a recorded item having either convex protrusions or a combination of convex protrusions and laser colored portions formed by laser irradiation, and can be used for decorative materials, friction materials, buffering materials, spacer materials, thermal insulation materials, optical materials, security materials, printing plate materials and surface-modified materials.

In the case of decorative materials, by creating an impression of volume in which the lettering or pattern appears to stand out, the image and visual appearance of the product or decorated item can be improved, which can be used for a variety of purposes such as promoting sales. In the case of Braille printing, because the convex protrusions are colored, unlike in conventional Braille printing, the location of the printing can also be readily detected by normally sighted people, which offers the advantage that products can be readily signaled as friendly to visually-impaired people. Furthermore, because information such as a lot number, and a separate use-by date and date of manufacture can also be printed in Braille, visually-impaired people can be provided with information relating to safety and hygiene. In another example, by conducting marking using both convex protrusions and printing on a portion of a book, CD or MD, a personal or company name can be specified clearly as an indicator of a permanent collection item. In a specific example, in the case where printing is to be conducted onto a portion of the rear cover of a book, print lamination is conducted using, for example, a solvent-based ethylene-vinyl acetate polymer as an adhesive and a stretched polypropylene film as a laminate film, thus forming a high-quality paper/laser coloring layer/adhesive/film configuration. The name of the owner can then be printed using laser light such as that from a $YVO_4$ laser.

In those cases where a surface protection layer is provided, printing of lettering or a pattern is basically conducted not at the surface protection layer, but within the internal laser coloring layer, and is consequently unaffected by the chemical nature, such as the hydrophilicity or hydrophobicity, of the surface protection layer. As a result, printing can be performed readily even onto items in which the outermost surface comprises a lightly treated or untreated polyolefin film, surfaces which have proven to be very difficult to print using conventional inks.

In the case of friction materials, the present invention can be used to form convex protrusions and thereby impart slip prevention properties to products which, when stacked, are prone to collapse of the stack. Suitable products for this application include film-based products, paper products or plastic products that are stacked during manufacture, transportation, storage or installation. Because the size and height of these convex protrusions can be changed as desired, convex protrusions that are best suited to the level of slip resistance required can be formed.

In the case of buffering materials, the present invention can be used as a cushioning material for protecting a product or component, for example, a temporary protective material that is used during manufacture, transportation or installation of a product, or as a protective material that provides permanent protection for certain functions or actions of a product or component. For example, in order to provide protection during transportation or shipping of an optical lens or component, protective convex protrusions can be formed with shapes that match the shape of the product.

In the case of spacer materials, convex protrusions can be used as spacers when the surface of a recorded item having convex protrusions is brought into contact with another surface. Conventional spacers are typically spherical, and positioning the spacers and fixing their position has proven complicated, but using a recording material of the present invention offers the advantages that the spacers can be formed at any desired position, in any pattern, and can also be fixed in those positions.

The space formed between the surface of the recorded item having convex protrusions and the other surface can be formed as a sloped space by sequentially altering the heights of the convex protrusions, or as a localized space by forming convex protrusions within only one region of the substrate. Furthermore, convex protrusions can also be used to create spaces between postcards, film sheets or ballot papers or the like, so that when these items are stacked in a pile, they can be readily separated from one another.

In the case of thermal insulation materials, the present invention can be used for materials that reduce thermal conductivity by allowing only point contact at the convex protrusions. For example, in order to reduce the effect of heat on structural components within precision instruments or optical equipment, either a recording material can be bonded to the surface of a targeted structural component using an adhesive or pressure-sensitive adhesive, or the recording material can be used in a sandwiched state between structural components.

In the case of optical materials, changes in the light transmittance, reflectance, and refractive index imparted by the size and height of the convex protrusions and the density of the colored portions are utilized. For example, by arranging the convex protrusions and colored portions on a substrate in accordance with certain rules, the resulting product can be used as a reflection control sheet or transmittance control sheet or the like.

In the case of security materials, products with a high degree of identifiability can be produced by forming printing and patterns by laser coloring, as well as an arbitrary pattern of convex protrusions. For example, the present invention can be used for personal identification cards, driver licenses and bank cards and the like. If a surface protection layer is also provided, then because the information is recorded within the laser coloring layer positioned between the surface protection layer and the substrate, writing or rewriting information is impossible using normal methods, enabling the safety of such security materials to be improved dramatically. Furthermore, convex protrusions formation can be used to form convex protrusion shapes that differ for each individual user.

In the case of printing plate materials, convex protrusions formed by laser irradiation can also be used as a printing plate, for example, a simple flexo plate. In such a method, a printing ink is adhered to only the convex protrusions, and the ink is then transferred to paper or the like via an anilox roller.

In the case of surface-modified materials, if convex protrusions exist at the outermost surface, then the fact that these convex protrusions make point contact with other surfaces can be utilized, for example, to provide materials that are resistant to adhesion by tape or the like. Furthermore, if the size, height and density of the convex protrusions are changed in a consecutive manner, then the surface-modified material can be used as a material with a graduated adhesion function.

A recording material of the present invention has a laser coloring layer of a desired hue, such as yellow, cyan, magenta, orange, white or black, and by conducting printing by laser irradiation, a recorded item with excellent color tone can be obtained. If required, by forming a surface protection layer on top of the laser coloring layer, excellent levels of water resistance, oil resistance and abrasion resistance can be achieved without any post processing following printing.

In the present invention, if a material with excellent laser colorability, such as a dye, an inorganic material such as a metal oxide, a nitrocellulose resin, or a pigment that exhibits strong laser absorption, is used within the laser coloring layer, then a pattern or lettering with sharp contrast can be recorded.

Furthermore, in a recording material of the present invention, because convex protrusions can be formed at the material surface at the same time as printing, three dimensional depth, improved visual appearance and design aesthetics, and functionality such as a physical protection action can be imparted to the material. Moreover, by using a material with excellent coloring properties in the laser coloring layer, such as a copper phosphonate having an aromatic ring, or an inorganic material containing copper atoms such as a mixed copper and molybdenum oxide, lettering and drawing with sharp contrast can be achieved.

In addition, according to a method of recording that uses a recording material having a laser coloring layer of the present invention, high-contrast recording that exhibits stable density and color can be conducted.

EXAMPLES

As follows is a more detailed description of the present invention based on a series of examples. In the examples, "parts" and "%" refer to parts by weight and % by weight respectively.

Synthesis Example 1

Synthesis of a Urethane Resin

A four-necked flask fitted with a stirrer, a thermometer, a reflux condenser, and a nitrogen gas inlet was charged with 1,000 parts of a polytetramethylene glycol (molecular weight: 2,000, this molecular weight represents a number average molecular weight measured by gel permeation chromatography) and 222 parts of isophorone diisocyanate, and the mixture was stirred for 5 hours at 85° C. under an atmosphere of nitrogen. Subsequently, the mixture was cooled to 40° C., 82 parts of isophorone diamine, 7.8 parts of di-n-butylamine, 1,244 parts of toluene, 1,244 parts of methyl ethyl ketone, and 573 parts of isopropyl alcohol (IPA) were added, and the resulting mixture was reacted for 5 hours at 40° C. under constant stirring. The solid fraction of the thus obtained urethane resin was 30%, and the viscosity was 350 cps (25° C.).

Synthesis Example 2

Synthesis of an Acrylic Resin

A four-necked flask fitted with a stirrer, a thermometer, a reflux condenser, and a nitrogen gas inlet was charged with 600 parts of isopropyl alcohol, and the temperature was raised to 80° C. with constant stirring and under an atmosphere of nitrogen. Subsequently, a mixed liquid prepared in advance and comprising 28 parts of acrylic acid, 20 parts of methyl acrylate, 420 parts of methyl methacrylate, 130 parts of butyl acrylate and 12 parts of azobisisobutyronitrile was added dropwise to the flask over two hours. One hour following completion of the dropwise addition, a further 2 parts of azobisisobutyronitrile was added, and the resulting mixture was reacted for a further two hours. Following completion of the reaction, the solid fraction was adjusted using methyl ethyl ketone. The solid fraction of the thus obtained acrylic resin was 30%, and the viscosity was 340 cps (25° C.).

A UV varnish was used as a coating liquid for forming a surface protection layer. The composition of this UV varnish is described below.

UV varnish 1: 3 parts of pentaerythritol hexaacrylate/3 parts of pentaerythritol triacrylate/30 parts of tripropylene glycol diacrylate/8 parts of 3-phenoxypropyl acrylate/6 parts of Irgacure 184 (manufactured by Ciba Specialty Chemicals Inc.)/50 parts of IPA.

Example 1

A mixture of 30 parts of a yellow pigment (Lionol Yellow 1823G, manufactured by Toyo Ink Mfg. Co., Ltd.), 80 parts of the urethane resin obtained in the synthesis example 1, and 10 parts of methyl ethyl ketone was mixed thoroughly in a paint shaker, yielding a printing ink. The thus obtained printing ink was diluted using a mixed solvent of methyl ethyl ketone, ethyl acetate and isopropyl alcohol (weight ratio 50:40:10), and the viscosity was adjusted to produce a time for a Zahn cup #3 (manufactured by Rigo Co., Ltd.) of 17 seconds (25° C.), thus yielding a dilute ink.

Using a corona discharge-treated PET film ("Ester E5102", film thickness: 12 μm, manufactured by Toyobo Co., Ltd.) as a substrate film, a gravure plate with a plate depth of 35 μm was used to conduct printing onto the treated surface of the substrate, at a print speed of 80 m/minute and a drying temperature of 60° C., thereby forming a printed item. A polyurethane-based anchor coating agent "EL540/CAT-RT80" (manufactured by Toyo-Morton, Ltd.) was then applied to, and subsequently dried on, the printed surface of the thus obtained PET printed item. Melt extrusion lamination was then conducted to bond a low-density polyethylene "TUX-FCD" (film thickness: 40 μm, manufactured by Tohcello Co., Ltd.) to the coated surface, with melted polyethylene acting as an intermediate layer. The resulting laminated printed item was aged for two days at 40° C., yielding a final recording material containing a laminated laser coloring layer.

Example 2

With the exception of using a white pigment (Titanix JR805, manufactured by Tayca Corporation) as the pigment, a recording material was obtained in the same manner as the example 1.

Example 3

13 parts of a fluoran-based leuco dye TG-11 (2-(2-fluorophenylamino)-6-diethylaminofluoran (manufactured by Hodogaya Chemical Co., Ltd.)) as a colorant, 37 parts of a 30% aqueous solution of methylolated phenol (manufactured by Hitachi Chemical Co., Ltd.) as a developer, 80 parts of the urethane resin, 15 parts of zinc borate as an additive, and 20 parts of methanol were treated for 2 hours in a paint shaker. The thus obtained ink was diluted with methanol to produce a time for a Zahn cup #3 (manufactured by Rigo Co., Ltd.) of 17 seconds (25° C.), thus yielding a laser coloring layer printing ink for gravure printing.

Printing and lamination were conducted in the same manner as the example 1, yielding a recording material.

Examples 4 to 32

Ink preparation and recording material preparation in the examples 4 to 32 were conducted in the same manner as the example 1.

The nature and parts by weight of the pigments, dyes and inorganic materials used in the examples 4 to 32 are shown in Table 1. The inorganic material was mixed, either alone or in combination with a pigment, with a resin and a solvent, and the mixture was then dispersed using a paint shaker. The binder resin, printing substrate and sealant film used in the ink preparation, and the lamination method are all shown in Table 1.

In the example 21, a coated paper was used as the substrate and the UV varnish was used as the surface protection layer. Following application, the UV varnish was dried, and then passed twice beneath an 80 W/cm high pressure mercury lamp with a separation distance of 10 cm and a conveyor speed of 10 m/minute.

In the examples 13 to 15 and the examples 22 to 32, a polyurethane-based adhesive "TM250/CAT-10" (manufactured by Toyo-Morton, Ltd.) was applied to, and then dried on, the printed surface of the obtained printed product. Dry lamination was then conducted by laminating the sealant film to the coated surface. The laminated printed item thus obtained was aged for three days at 40° C.

TABLE 1

| | Recording material | | | | | | Surface protection layer | |
|---|---|---|---|---|---|---|---|---|
| | Laser coloring layer | | | | | | | |
| | Pigment/Dye | | Inorganic material | | | | | |
| Example | | Quantity added (weight %) | | Quantity added (weight %) | Binder resin | Substrate | Sealant film | Lamination method |
| Example 1 | Yellow pigment | 15 | — | — | Urethane resin | PET | PE | EL |
| Example 2 | White pigment | " | — | — | " | " | " | " |
| Example 3 | Fluoran-based leuco dye | " | — | — | " | " | " | " |
| Example 4 | — | — | Copper carbonate | 30 | " | " | " | " |
| Example 5 | Yellow pigment/ white pigment | 5/10 | — | — | " | " | " | " |
| Example 6 | Yellow pigment | 15 | ATO | 20 | " | Ny | CPP | " |
| Example 7 | " | " | Copper carbonate | " | " | " | " | " |
| Example 8 | " | " | Iron oxide | " | " | " | " | " |
| Example 9 | " | " | Nickel carbonate | " | " | " | " | " |
| Example 10 | " | " | Chromium oxide | " | " | " | " | " |
| Example 11 | " | " | Zirconium oxide | " | " | " | " | " |
| Example 12 | " | " | Copper carbonate | " | " | " | " | " |
| Example 13 | White pigment | " | " | " | Acrylic resin | PET | PE | DL |
| Example 14 | Yellow pigment/ white pigment | 5/10 | " | " | " | " | " | " |
| Example 15 | — | — | Mixed copper and molybdenum oxide | " | " | " | " | " |
| Example 16 | Cyan pigment/ white pigment | 5/10 | " | " | " | PET | PE | EL |
| Example 17 | Carbon black | 20 | — | — | " | " | " | " |
| Example 18 | Yellow pigment | 0.04 | Copper carbonate | 0.04 | " | " | " | " |
| Example 19 | " | 30 | " | 65 | " | " | " | " |
| Example 20 | " | 15 | — | 20 | Urethane resin/ nitrocellulose | " | " | " |
| Example 21 | " | " | — | " | Urethane resin/ nitrocellulose | Coated paper | UV varnish 1 | |
| Example 22 | Yellow pigment/ white pigment | 5/10 | Mixed copper and molybdenum oxide | " | Urethane resin | PET | PE | DL |
| Example 23 | — | — | Zinc oxide | 30 | " | " | " | " |
| Example 24 | — | — | Mixed copper and molybdenum oxide | 50 | " | " | " | " |
| Example 25 | Yellow pigment/ white pigment | 5/15 | Copper carbonate | 10 | " | " | " | " |
| Example 26 | Yellow pigment/ white pigment | " | " | " | " | " | " | " |
| Example 27 | Yellow pigment/ white pigment | " | " | " | " | " | " | " |
| Example 28 | Yellow pigment/ white pigment | " | " | " | " | " | " | " |
| Example 29 | Yellow pigment/ white pigment | " | " | " | " | " | " | " |
| Example 30 | Yellow pigment/ white pigment | " | " | " | " | " | " | " |
| Example 31 | Yellow pigment/ white pigment | " | " | " | " | " | " | " |
| Example 32 | Yellow pigment/ white pigment | " | " | " | " | " | " | " |

Yellow pigment: Lionol Yellow 1823G (manufactured by Toyo Ink Mfg. Co., Ltd.)
White pigment: Titanix JR805 (manufactured by Tayca Corporation)
Fluoran-based leuco dye: 2-(2-fluorophenylamino)-6-diethylaminofluoran (manufactured by Hodogaya Chemical Co., Ltd.)
Cyan pigment: Lionol blue 7330 (manufactured by Toyo Ink Mfg. Co., Ltd.)
Ny: "ON-RT" (manufactured by Unitika Ltd.)
CPP: "CP GHC" (manufactured by Tohcello Co., Ltd., film thickness: 30 μm)
EL: extrusion lamination (melt extrusion)
DL: dry lamination
Urethane resin: the urethane resin obtained in the synthesis example 1
Acrylic resin: the acrylic resin obtained in the synthesis example 2

Using a $YVO_4$ laser (MD-9600, manufactured by Keyence Corporation (continuous wave output: 6 W)), a YAG laser (MD-H9800, manufactured by Keyence Corporation (continuous wave output: 10 W)), and a $CO_2$ laser (ML-G9300, manufactured by Keyence Corporation (continuous wave output: 30 W)), each of the recording materials obtained in the examples 1 through 32 was subjected to laser print recording.

Laser printing was conducted on each of the recording materials obtained in the examples 1 through 32, and the visibility, surface state, and solvent resistance were tested and evaluated. The methods used in the tests are described below.

Visibility: Evaluated on a 3-step scale. The results are shown in Table 2.
 A: print density high, and visibility good
 B: print density low, or visibility poor
 C: print density almost non-existent, or visibility almost non-existent
Surface state (swelling, damage): Evaluated on a 3-step scale. The results are shown in Table 2.
 A: absolutely no swelling at laser-irradiated surface
 B: some slight swelling visible at laser-irradiated surface
 C: significant swelling visible at laser-irradiated surface
Solvent resistance: Following printing, a defatted surface impregnated with methyl ethyl ketone was rubbed 10 times across the laser-irradiated surface of the recording material, and the surface state was then evaluated. The results are shown in Table 2.
 A: absolutely no detachment of the printed surface on the laser-irradiated side
 B: some slight detachment of the printed surface on the laser-irradiated side
 C: almost total detachment of the printed surface on the laser-irradiated side
[Table 2]

TABLE 2

| Example | Laser light source | Absorption at 1064 nm (%) | Laser power ratio (%) | Q-switch frequency (kHz) | Scan speed (mm/s) | Surface state | Solvent resistance | Visibility |
|---|---|---|---|---|---|---|---|---|
| Example 1 | YAG | 2 | 80 | 15 | 500 | A | A | A to B |
| Example 2 | " | 4 | " | " | " | A | A | A to B |
| Example 3 | " | 10 | 20 | " | " | A | A | A |
| Example 4 | " | 10 | " | " | " | A | A | A |
| Example 5 | " | 3 | " | " | " | A | A | A to B |
| Example 6 | YVO$_4$ | 15 | " | " | " | A | A | A |
| Example 7 | " | 15 | " | " | " | A | A | A |
| Example 8 | " | 20 | " | " | " | A | A | A |
| Example 9 | " | 15 | " | " | " | A | A | A |
| Example 10 | " | 20 | " | " | " | A | A | A |
| Example 11 | CO$_2$ | 25 | " | — | " | B | A | A |
| Example 12 | " | 15 | " | — | " | B | A | A |
| Example 13 | YVO$_4$ | 27 | " | 15 | " | A | A | A |
| Example 14 | " | 25 | " | " | " | A | A | A |
| Example 15 | " | 25 | " | " | " | A | A | A |
| Example 16 | " | 25 | " | " | " | A | A | A |
| Example 17 | " | 25 | " | " | " | A | A | A |
| Example 18 | " | 5 | " | " | " | A | A | A to B |
| Example 19 | " | 30 | " | " | " | A | A | A to B |
| Example 20 | " | 15 | " | " | " | A | A | A |
| Example 21 | " | 15 | " | " | " | A | A | A |
| Example 22 | " | 17 | " | " | " | A | A | A |
| Example 23 | " | 0.1> | " | " | " | A | A | A to B |
| Example 24 | " | 97 | " | " | " | A to B | A | A to B |
| Example 25 | " | 10 | 90 | " | " | A | A | A to B |
| Example 26 | " | " | 0.5 | " | " | A | A | B |
| Example 27 | " | " | 20 | 110 | " | A | A | B |
| Example 28 | " | " | " | 0.5 | " | A | A | B |
| Example 29 | " | " | " | 15 | 5000 | A | A | B |
| Example 30 | " | " | " | " | 5 | A | A | A to B |
| Example 31 | " | " | 50 | " | 5000 | A | A | A to B |
| Example 32 | " | " | " | " | 500 | A | A | A |

Synthesis Example 3

Synthesis of copper phenylphosphonate 130 parts of phenylphosphonic acid was dissolved in 1350 parts of water. To the resulting solution was added 103 parts of copper sulfate pentahydrate, and the resulting mixture was stirred for two hours at room temperature. The precipitate was filtered, washed with water, and then dried under reduced pressure at 100° C., yielding 35 parts of copper phenylphosphonate.

Synthesis Example 4

Synthesis of copper 4-ethylphenylphosphonate

With the exception of using 153 parts of 4-ethylphenylphosphonic acid instead of phenylphosphonic acid, copper 4-ethylphenylphosphonate was prepared in the same manner as the synthesis example 3.

Synthesis Example 5

Synthesis of a Urethane Resin

A four-necked flask fitted with a stirrer, a thermometer, a reflux condenser, and a nitrogen gas inlet was charged with 1,000 parts of a polyester diol with a molecular weight of 2,000 obtained from adipic acid and 3-methyl-1,5-pentanediol, and 222 parts of isophorone diisocyanate, and the mixture was reacted for 5 hours at 85° C. under an atmosphere of nitrogen. Subsequently, the mixture was cooled to 40° C., 82 parts of isophorone diamine, 7.8 parts of di-n-butylamine, 1,244 parts of toluene, 1,244 parts of methyl ethyl ketone, and 573 parts of isopropyl alcohol were added, and the resulting mixture was reacted for 5 hours at 40° C. under constant stirring. The solid fraction of the thus obtained urethane resin was 30%, and the viscosity was 350 cps (25° C.).

Synthesis Example 6

Synthesis of an Acrylic Resin

A four-necked flask fitted with a stirrer, a thermometer, a reflux condenser, and a nitrogen gas inlet was charged with 600 parts of isopropyl alcohol, and the temperature was raised to 80° C. with constant stirring and under an atmosphere of nitrogen. Subsequently, a mixed liquid prepared in advance and comprising 48 parts of acrylic acid, 420 parts of methyl methacrylate, 132 parts of butyl acrylate and 12 parts of azobisisobutyronitrile was added dropwise to the flask over two hours. One hour following completion of the dropwise addition, a further 2 parts of azobisisobutyronitrile was added, and the resulting mixture was reacted for a further two hours. Following completion of the reaction, the solid fraction was adjusted using methyl ethyl ketone. The solid fraction of the thus obtained acrylic resin was 30%, and the viscosity was 350 cps (25° C.).

Synthesis Example 7

Synthesis of a Water-Based Acrylic Resin

A four-necked flask fitted with a stirrer, a thermometer, a reflux condenser, and a nitrogen gas inlet was charged with 600 parts of isopropyl alcohol, and the temperature was raised to 80° C. with constant stirring and under an atmosphere of nitrogen. Subsequently, a mixed liquid prepared in advance and comprising 48 parts of acrylic acid, 420 parts of methyl methacrylate, 132 parts of butyl acrylate and 12 parts of azobisisobutyronitrile was added dropwise to the flask over two hours. One hour following completion of the dropwise addition, a further 2 parts of azobisisobutyronitrile was added, and the resulting mixture was reacted for a further two hours. Following completion of the reaction, the reaction mixture was cooled to 50° C., 45 parts of dimethylethanolamine was added, and the mixture was stirred thoroughly. Ion-exchanged water was then added, and the temperature was raised to remove the solvent. The solid fraction of the thus obtained water-based acrylic resin (C) was 30%, the viscosity was 400 cps (25° C.), and the pH was 7.9.

A UV varnish was used as a coating liquid for forming the surface protection layer. The composition of these UV varnishes are as follows:

UV varnish 2: 20 parts of pentaerythritol hexaacrylate/10 parts of pentaerythritol triacrylate/8 parts of tripropylene glycol diacrylate/6 parts of 3-phenoxypropyl acrylate/6 parts of Irgacure 184 (manufactured by Ciba Specialty Chemicals Inc.)/50 parts of IPA.

UV varnish 3: 25 parts of pentaerythritol hexaacrylate/17 parts of pentaerythritol triacrylate/1 part of tripropylene glycol diacrylate/1 part of 3-phenoxypropyl acrylate/6 parts of Irgacure 184 (manufactured by Ciba Specialty Chemicals Inc.)/50 parts of IPA.

Example 33

13 parts of the fluoran-based leuco dye TG-11 as a colorant, 37 parts of a 30% aqueous solution of methylolated phenol (manufactured by Hitachi Chemical Co., Ltd.) as a developer, 33 parts of a 20% methanol solution of a nylon resin 995F, 17 parts of zinc borate as an additive, and 20 parts of methanol were treated for 2 hours in a paint shaker. The thus obtained ink was diluted with methanol to produce a time for a Zahn cup #3 (manufactured by Rigo Co., Ltd.) of 18 seconds (25° C.), thus yielding a laser coloring layer printing ink for gravure printing.

Using a corona discharge-treated PET film ("Ester E5102", film thickness: 12 μm, manufactured by Toyobo Co., Ltd.) as a substrate film, a gravure plate with a plate depth of 40 μm was used to conduct printing onto the treated surface of the substrate, at a print speed of 80 m/minute and a drying temperature of 60° C., thereby forming a printed item. A polyurethane-based anchor coating agent "EL540/CAT-RT80" (manufactured by Toyo-Morton, Ltd.) was then applied to, and subsequently dried on, the printed surface of the thus obtained PET printed item. Melt extrusion lamination was then conducted to bond a low-density polyethylene "TUX-FCD" (film thickness: 40 μm, manufactured by Tohcello Co., Ltd.) to the coated surface, with melted polyethylene acting as an intermediate layer. The resulting laminated printed item was aged for two days at 40° C., yielding a final recording material containing a laminated laser coloring layer.

Example 34

With the exception of using OPP as the substrate film, preparation was conducted in the same manner as the example 33.

Example 35

100 parts of copper phenylphosphonate as the pigment and 200 parts of the urethane resin as a resin were premixed, and then dispersed for 5 hours using a paint shaker (using glass beads). Subsequently, 200 parts of the urethane resin and methyl ethyl ketone were added, and the solid fraction was adjusted to 30%. The thus obtained ink was then diluted 50% using methyl ethyl ketone, yielding a laser coloring layer printing ink for gravure printing. Printing and lamination were conducted in the same manner as the example 33.

Examples 36 to 46

1) The dyes or pigments, additives and resins used in forming the laser coloring layer, 2) the substrate film used for printing, and 3) the lamination method and sealant film used during lamination are shown in Table 3. In the examples 37 to 40, 20 parts of ATO, 1 part of carbon black, 1 part of graphite or 20 parts of copper carbonate respectively was added as an additive.

Examples 47 and 48

A solvent-based OP varnish (nitrocellulose-based varnish) was applied to the printed item and then dried, thus forming a surface protection layer and yielding a recording material.

Examples 49 to 51

1) The pigments, dyes, inorganic materials and resins used in forming the laser coloring layer, 2) the paper used for printing, and 3) the UV varnish used are shown in Table 3. The UV varnish was applied and then dried. Subsequently, UV irradiation was conducted by passing the product twice beneath an 80 W/cm high pressure mercury lamp with a separation distance of 10 cm and a conveyor speed of 10 m/minute, thus yielding a recording material.

Example 52

A solvent-based ethylene-vinyl acetate copolymer adhesive was applied to the printed item and dried, and an OPP sheet was then bonded to the surface, yielding a recording material.

A polyurethane-based adhesive "TM250/CAT-10" (manufactured by Toyo-Morton, Ltd.) was applied to, and then dried on, the printed surface of each of the obtained printed items. Lamination was then conducted by layering the sealant film to the coated surface. The laminated printed item thus obtained was aged for three days at 40° C.

TABLE 3

| Example | Pigment, dye (colorant, developer), inorganic material | | | Resin | Printing Substrate | Sealant film | Lamination method | Film formation by coating | |
|---|---|---|---|---|---|---|---|---|---|
| | Laser coloring layer | | | | | Surface protection layer | | | |
| Example 33 | Fluoran-based leuco dye 1 | Methylolated phenol | Zinc borate | Polyvinyl alcohol | PET | PE | EL | | |
| Example 34 | Fluoran-based leuco dye 1 | Methylolated phenol | Zinc borate | Polyvinyl alcohol | OPP | " | " | | |
| Example 35 | Copper phenylphosphonate | | | Urethane resin | PET | PE | EL | | |
| Example 36 | Copper 4-ethylphenyl phosphonate | | | " | " | " | " | | |
| Example 37 | Copper phenylphosphonate | | ATO | " | " | " | " | | |
| Example 38 | Copper phenylphosphonate | | Carbon black | " | " | " | " | | |
| Example 39 | Copper phenylphosphonate | | Graphite | " | " | " | " | | |
| Example 40 | Copper phenylphosphonate | | Copper carbonate | " | " | " | " | | |
| Example 41 | Copper phenylphosphonate | | | Acrylic resin | " | " | " | | |
| Example 42 | Copper phenylphosphonate | | | " | " | " | DL | | |
| Example 43 | Copper phenylphosphonate | | | " | OPP | " | " | | |
| Example 44 | Copper phenylphosphonate | | | " | Ny | " | " | | |
| Example 45 | Copper phenylphosphonate | | | " | PET | CPP | " | | |
| Example 46 | Copper phenylphosphonate | | | " | " | PE | " | | |
| Example 47 | Copper phenylphosphonate | | | Water-based acrylic resin | " | | | OP varnish | Hot air drying |
| Example 48 | Copper phenylphosphonate | | | Urethane resin | " | | | " | " |
| Example 49 | Copper phenylphosphonate | | | " | Coated paper | | | UV varnish 1 | UV curing |
| Example 50 | Copper phenylphosphonate | | | " | " | | | UV varnish 2 | " |
| Example 51 | Copper phenylphosphonate | | | " | " | | | UV varnish 3 | " |
| Example 52 | Copper phenylphosphonate | | | " | " | OPP | | | |

Fluoran-based leuco dye: 2-(2-fluorophenylamino)-6-diethylaminofluoran (manufactured by Hodogaya Chemical Co., Ltd.)
OPP: "Pylen P2161" (corona discharge-treated film, manufactured by Toyobo Co., Ltd., film thickness: 20 μm)
Ny: "ON-RT" (manufactured by Unitika Ltd.)
CPP: "CP GHC" (manufactured by Tohcello Co., Ltd., film thickness: 30 μm)
EL: extrusion lamination (melt extrusion)
DL: dry lamination
Copper phenylphosphonate: the copper phenylphosphonate obtained in the synthesis example 3
Copper 4-ethylphenylphosphonate: the copper 4-ethylphenylphosphonate obtained in the synthesis example 4
Urethane resin: the urethane resin obtained in the synthesis example 5
Acrylic resin: the acrylic resin obtained in the synthesis example 6
Water-based acrylic resin: the water-based acrylic resin obtained in the synthesis example 7

A print test using a laser was conducted on each of the recording materials obtained in the examples 33 through 52, and the O.D. value was evaluated for the printed product. Furthermore, the surface state of the film upon heating of the printed item, and particularly the degree of swelling (of the film surface on the side exposed to heating), was evaluated visually.

(Laser Method of Recording)

Recording of each of the obtained recording materials was conducted using a $YVO_4$ laser (i-Marker 10W, manufactured by YVO Inc. (continuous wave output: 10 W)) (continuous marking), and the reflection density (O.D. value) of the recorded image was measured with a Macbeth densitometer. The results recorded are shown in Table 4.

Surface state (swelling): Evaluated on a 3-step scale. The results are shown in Table 4.
  A: absolutely no swelling at heated surface
  B: some slight swelling visible at heated surface
  C: significant swelling visible at heated surface Solvent resistance: Following printing, a defatted surface impregnated with methyl ethyl ketone was rubbed 10 times across the printed surface of the recording material, and the surface state was then evaluated. The results are shown in Table 4.

A: absolutely none of the printed surface on the heated side was removed

B: some slight removal of the printed surface on the heated side

C: significant removal of the printed surface on the heated side

TABLE 4

| Example | Evaluation results | | |
| --- | --- | --- | --- |
| | O.D. value | State of printed surface | Solvent resistance |
| Example 33 | 1.01 | A | A |
| Example 34 | 1.00 | A | A |
| Example 35 | 1.05 | A | A |
| Example 36 | 1.00 | A | A |
| Example 37 | 1.10 | A | A |
| Example 38 | 1.11 | A | A |
| Example 39 | 1.10 | A | A |
| Example 40 | 1.13 | A | A |
| Example 41 | 1.02 | A | A |
| Example 42 | 1.03 | A | A |
| Example 43 | 1.09 | A | A |
| Example 44 | 1.08 | A | A |
| Example 45 | 1.10 | A | A |
| Example 46 | 1.10 | A | A |
| Example 47 | 1.08 | A to B | A to B |
| Example 48 | 1.00 | A to B | A to B |
| Example 49 | 1.00 | A to B | A to B |
| Example 50 | 1.07 | A | A |
| Example 51 | 1.04 | A | A |
| Example 52 | 1.06 | A | A |

Example 53

13 parts of the fluoran-based leuco dye TG-11 as a colorant, 37 parts of a 30% aqueous solution of methylolated phenol (manufactured by Hitachi Chemical Co., Ltd.) as a developer, 5 parts of Matsumoto microspheres F-30 (manufactured by Matsumoto Yushi-Seiyaku Co., Ltd., particle size: 10 to 20 μm), 33 parts of a 20% methanol solution of a nylon resin 995F, 17 parts of zinc borate as an additive, and 20 parts of methanol were treated for 2 hours in a paint shaker, yielding a laser coloring layer printing ink.

Using a corona discharge-treated PET film ("Ester E5102", film thickness: 12 μm, manufactured by Toyobo Co., Ltd.) as a substrate film, the laser coloring layer printing ink was applied to the treated surface of the substrate using a #16 bar coater, and was then dried for 30 minutes at a temperature of 60° C. In this manner, a recording material with no surface protection layer was obtained.

Example 54

120 parts of copper 4-ethylphenylphosphonate as the pigment and 200 parts of the urethane resin as a resin were premixed, and then dispersed for 2 hours using a paint shaker (using glass beads). Subsequently, 200 parts of the urethane resin and methyl ethyl ketone were added, and the solid fraction was adjusted to 30%, yielding a laser coloring layer printing ink.

Subsequently, using a corona discharge-treated PET film ("Ester E5102", film thickness: 12 μm, manufactured by Toyobo Co., Ltd.) as a substrate film, a gravure plate with a plate depth of 40 μm was used to conduct printing onto the treated surface of the substrate, at a print speed of 80 m/minute and a drying temperature of 60° C., thereby forming a printed item. Using a polyurethane-based adhesive "TM250/CAT-10" (manufactured by Toyo-Morton, Ltd.), a PET film was then bonded to the printed surface of the thus obtained PET printed item by dry lamination. Aging was then conducted for two days at 40° C., yielding a recording material with a PET film as the surface protection layer.

Examples 55 to 57

1) The pigments, dyes, inorganic materials and coating resins used, and 2) the substrate films and surface protection layer films used for coating are shown in Table 5. The method of printing the laser coloring layer printing ink and the film lamination method were the same as those of the example 54. The quantity added of the ATO additive and the mixed copper and molybdenum oxide in the examples 56 and 57 respectively was 30 parts in each case.

Example 58

With the exceptions of using the acrylic resin instead of the urethane resin, using a coated paper for the substrate, and using a CPP film for the surface protection layer, preparation was conducted in the same manner as the example 55.

Example 59

Matsumoto microspheres F-50 (manufactured by Matsumoto Yushi-Seiyaku Co., Ltd., particle size: 10 to 20 μm) (10% by weight) dispersed in the acrylic resin were applied to a coated paper and then dried at 50° C. Subsequently, the same colored ink as the example 58 was applied, and then dried at 50° C. In this manner, a recording material with no surface protection layer was obtained.

Example 60

With the exceptions of using an OPP film as the substrate and a UV varnish as the surface protection layer, preparation was conducted in the same manner as the example 58.

Example 61

5 parts of Matsumoto microspheres F-30 (manufactured by Matsumoto Yushi-Seiyaku Co., Ltd., particle size: 10 to 20 μm) were used as a foaming agent within the coating liquid of the example 60, and the liquid was applied to the substrate using a #16 bar coater, and then dried for 30 minutes at a temperature of 60° C. A UV varnish was then applied, and ultraviolet curing was conducted. The ultraviolet irradiation was conducted by passing the product twice beneath an 80 W/cm high pressure mercury lamp with a separation distance of 10 cm and a conveyor speed of 10 m/minute.

Example 62

A pellet-type resin composition (master batch) was prepared by using a mixing kneader to knead together 80 parts of a PETG polyester resin (Eastar PETG 6763, manufactured by Eastman Chemical Company) and 20 parts of copper phenylphosphonate. 50 parts of the thus obtained master batch, and 50 parts of the same polyester resin used in preparing the master batch were then mixed together, and a melt extrusion was conducted at 220 to 260° C., yielding a recording film with a thickness of 200 µm. Subsequently, this recording film was sandwiched between and bonded to formed PET sheets, thus yielding a recording material.

Example 63

The laser coloring layer printing ink obtained in the example 55 was applied to a formed PET sheet and dried, yielding a laser coloring layer. Another formed PET sheet was then bonded to the top of the laser coloring layer, yielding a recording material.

Example 64

The polyurethane-based adhesive used in the example 54 was applied to, and the dried on, the laser coloring layer obtained in the example 63. Subsequently, a CPP film was bonded using a heated roller, thus yielding a recording material.
[Table 5]

was conducted from the side of the surface protection layer in each case, or from the side of the laser coloring layer in those materials with no surface protection layer. Recording was conducted using a pattern of circles and rectangles of varying sizes. In an ideal situation, the convex protrusions project upwards with an identical shape to the printed portions when viewed from above.

Evaluations were conducted for the O.D. value, the shape of the convex protrusions, and the solvent resistance.

O.D. value: The reflection density (O.D. value) of the recorded image was measured with a Macbeth densitometer. The results are shown in Table 6.

Convex protrusion shape: Evaluated on a 3-step scale. The results are shown in Table 6.

A: the laser-irradiated surface swelled and formed convex protrusions in accordance with the pattern B: the laser-irradiated surface varied slightly from the pattern, so that an identical pattern of convex protrusions was not formed

TABLE 5

| Example | Laser coloring layer | | | | | | Substrate | Surface protection layer |
|---|---|---|---|---|---|---|---|---|
| | Pigment, dye (colorant, developer), inorganic material | | | Foaming agent | Resin | Forming method | | |
| Example 53 | Fluoran-based leuco dye | Methylolated phenol | Zinc borate | Used | Nylon resin | Coating liquid | PET film | No surface protection layer |
| Example 54 | Copper 4-ethylphenyl phosphonate | | | | Urethane resin | " | " | PET film |
| Example 55 | Copper phenylphosphonate | | | | " | " | " | " |
| Example 56 | Copper phenylphosphonate | | ATO | | " | " | " | " |
| Example 57 | Copper phenylphosphonate | | Mixed copper and molybdenum oxide | | " | " | " | " |
| Example 58 | Copper phenylphosphonate | | | | Acrylic resin | " | Coated paper | CPP film |
| Example 59 | Copper phenylphosphonate | | | Used | " | " | " | No surface protection layer |
| Example 60 | Copper phenylphosphonate | | | | " | " | OPP film | UV varnish 2 |
| Example 61 | Copper phenylphosphonate | | | Used | " | " | " | " |
| Example 62 | Copper phenylphosphonate | | | | PETG | Kneading | Formed PET sheet | Formed PET sheet |
| Example 63 | Copper phenylphosphonate | | | | Urethane resin | Coating liquid | Formed PET sheet | Formed PET sheet |
| Example 64 | Copper phenylphosphonate | | | | " | " | Formed PET sheet | CPP film |

Fluoran-based leuco dye: 2-(2-fluorophenylamino)-6-diethylaminofluoran (manufactured by Hodogaya Chemical Co., Ltd.)
OPP: "Pylen P2161" (corona discharge-treated film, manufactured by Toyobo Co., Ltd., film thickness: 20 µm)
CPP: "CP GHC" (manufactured by Tohcello Co., Ltd., film thickness: 30 µm)
Copper phenylphosphonate: the copper phenylphosphonate obtained in the synthesis example 3
Copper 4-ethylphenylphosphonate: the copper 4-ethylphenylphosphonate obtained in the synthesis example 4
Urethane resin: the urethane resin obtained in the synthesis example 5
Acrylic resin: the acrylic resin obtained in the synthesis example 6

Recording of each of the recording materials obtained in the examples 53 to 64 was conducted using a YVO$_4$ laser (i-Marker 10W, manufactured by YVO Inc. (continuous wave output: 10 W)) (continuous marking). The laser irradiation C: the laser-irradiated surface varied significantly from the pattern and was distorted Solvent resistance: Following printing, a defatted surface impregnated with methyl ethyl ketone was rubbed 10 times across the printed surface of the recording material, and the surface state was then evaluated. The results are shown in Table 6.

A: absolutely none of the printed surface was removed
B: some slight removal of the printed surface occurred
C: significant removal of the printed surface occurred

TABLE 6

| | Evaluation results | | |
|---|---|---|---|
| Example | O.D. value | Convex protrusion shape | Solvent resistance |
| Example 53 | 0.95 | B | B |
| Example 54 | 0.98 | A | A |

TABLE 6-continued

| Example | Evaluation results | | |
|---|---|---|---|
| | O.D. value | Convex protrusion shape | Solvent resistance |
| Example 55 | 1.00 | A | A |
| Example 56 | 1.03 | A | A |
| Example 57 | 1.09 | A | A |
| Example 58 | 1.05 | A | A |
| Example 59 | 0.92 | B | B |
| Example 60 | 1.04 | A | A |
| Example 61 | 0.94 | A | A |
| Example 62 | 0.94 | A to B | A |
| Example 63 | 0.96 | A to B | A |
| Example 64 | 1.00 | A | A |

The invention claimed is:

1. A recording material comprising a plastic film substrate, a laser coloring layer on the plastic film substrate, and a surface protection layer of a plastic film on the laser coloring layer, wherein
the laser coloring layer comprises (i) a pigment, (ii) a mixed copper and molybdenum oxide, and (iii) a binder resin comprising a urethane resin,
the laser coloring layer exhibits an absorption of light at a wavelength within the range of from 700 to 12,000 nm, and
the plastic film is selected from the group consisting of a polyethylene film, a polypropylene film and a polyester film.

2. The recording material according to claim 1, wherein the pigment comprises one or more pigments selected from the group consisting of a yellow pigment, a magenta pigment and a cyan pigment.

3. The recording material according to claim 1, wherein the pigment comprises one or more pigments selected from the group consisting of titanium oxide, zinc sulfide, zinc oxide, precipitated barium sulfate, barium carbonate and precipitated calcium carbonate.

4. The recording material according to claim 1, wherein the pigment is copper phenylphosphonate.

5. The recording material according to claim 1, wherein either the laser coloring layer comprises a foaming agent, or the recording material further comprises a layer comprising a foaming agent.

6. The recording material according to claim 1, wherein the laser coloring layer is formed by a process comprising printing a printing ink comprising (i) the pigment, (ii) the mixed copper and molybdenum oxide, and (iii) the binder resin comprising a urethane resin, onto the plastic film substrate.

7. The recording material according to claim 1, wherein the laser coloring layer is formed by a process comprising applying a coating liquid comprising (i) the pigment, (ii) the mixed copper and molybdenum oxide, and (iii) the binder resin comprising a urethane resin, onto the plastic film substrate.

8. The recording material according to claim 1, wherein the laser coloring layer is formed by a process comprising bonding a sheet or a film onto the plastic film substrate, wherein the sheet or the film comprises (i) the pigment, (ii) the mixed copper and molybdenum oxide, and (iii) the binder resin including a urethane resin.

9. The recording material according to claim 1, wherein an absorption by the laser coloring layer of light at a wavelength of 1,064 nm is within the range of from 0.1 to 95%.

10. A method of recording, wherein a YAG laser or a YVO$_4$ laser is irradiated onto a recording material according to claim 1.

11. The method of recording according to claim 10, wherein laser irradiation conditions satisfy at least one of (1) to (3) listed below:
(1) 80≧laser power ratio (%)≧1 wherein, the laser power ratio is expressed as a ratio relative to a maximum output of the laser, and laser output, in continuous wave output, is within a range from 6 to 30 W,
(2) 100≧Q-switch frequency (kHz)≧1 wherein, the Q-switch frequency represents a pulse frequency,
(3) 4,000≧scan speed (mm/second)≧10.

12. A method of recording, wherein by irradiating a laser onto the recording material according to claim 9, gas is generated within the recording material and forms convex protrusions.

13. A method of producing a recorded item, comprising the step of irradiating a YAG laser or a YVO$_4$ laser onto the recording material according to claim 1.

14. The method of producing the recorded item according to claim 13, wherein laser irradiation conditions satisfy at least one of (1) to (3) listed below:
(1) 80≧laser power ratio (%)≧1 wherein, the laser power ratio is expressed as a ratio relative to a maximum output of the laser, and laser output, in continuous wave output, is within a range from 6 to 30 W,
(2) 100≧Q-switch frequency (kHz)≧1 wherein, the Q-switch frequency represents a pulse frequency,
(3) 4,000≧scan speed (mm/second) 10.

15. A method of producing a recorded item, comprising the step of irradiating a laser onto the recording material according to claim 1, thereby generating gas within the recording material and forming convex protrusions.

16. A material for food packaging, which comprises the recording material according to claim 1.

17. A material for industrial resources, which comprises the recording material according to claim 1.

18. A recorded item, which is obtained using the method of producing a recorded item according to claim 15, and wherein a height of the convex protrusions is within the range of from 1 to 3,000 μm.

19. A recorded item, which is obtained using the method of producing a recorded item according to claim 15, and can be used for Braille.

20. A recorded item, which is obtained using the method of producing a recorded item according to claim 15, and can be used for any one of friction materials, buffering materials, spacer materials, thermal insulation materials, optical materials, security materials, printing plate materials or surface-modified materials.

21. A recording material comprising a plastic film substrate, a laser coloring layer on the plastic film substrate, and a surface protection layer of a plastic film on the laser coloring layers, wherein
the laser coloring layer comprises (i) a pigment, (ii) a mixed copper and molybdenum oxide, and (iii) a binder resin comprising a urethane resin,
the laser coloring layer exhibits an absorption of light at a wavelength within the range of from 700 to 12,000 nm, and
the laser coloring layer and the surface protection layer are bonded via an adhesive layer.

* * * * *